(12) United States Patent
Rathor

(10) Patent No.: US 12,445,478 B2
(45) Date of Patent: Oct. 14, 2025

(54) ADAPTIVE PROFILING OF CLOUD SERVICES USING MACHINE LEARNING FOR MALWARE DETECTION

(71) Applicant: CrowdStrike, Inc., Sunnyvale, CA (US)

(72) Inventor: Hirendra Rathor, Broadlands, VA (US)

(73) Assignee: CrowdStrike, Inc., Sunnyvale, CA (US)

( * ) Notice: Subject to any disclaimer, the term of this patent is extended or adjusted under 35 U.S.C. 154(b) by 300 days.

(21) Appl. No.: 18/053,838

(22) Filed: Nov. 9, 2022

(65) Prior Publication Data
US 2024/0154987 A1 May 9, 2024

(51) Int. Cl.
*H04L 9/40* (2022.01)
(52) U.S. Cl.
CPC ...... *H04L 63/1433* (2013.01); *H04L 63/1416* (2013.01); *H04L 63/1441* (2013.01)
(58) Field of Classification Search
CPC .......... G06F 21/55; G06F 2009/45587; G06F 9/45533; G06F 9/542; H04L 63/1416; H04L 63/1425; H04L 63/1433; H04L 63/1441; H04L 63/1408; H04L 63/0263
See application file for complete search history.

(56) References Cited

U.S. PATENT DOCUMENTS

| | | | |
|---|---|---|---|
| 10,936,717 B1 * | 3/2021 | Herman Saffar | ... G06F 9/45558 |
| 11,122,058 B2 | 9/2021 | Abu-Nimeh | |
| 2013/0036470 A1 * | 2/2013 | Zhu | ...... H04L 63/0227 726/23 |
| 2015/0195299 A1 | 7/2015 | Zoldi et al. | |
| 2019/0020665 A1 * | 1/2019 | Surcouf | ................ H04L 9/3236 |
| 2021/0051160 A9 | 2/2021 | Abu-Nimeh | |
| 2021/0273957 A1 | 9/2021 | Boyer et al. | |

FOREIGN PATENT DOCUMENTS

EP   3414683   12/2018

OTHER PUBLICATIONS

Osnat, Rani, "Preventing Container Breakouts with Dynamic System Call Profiling," Aqua Blog, Aug. 2, 2018.
PaloAlto Networks, "Runtime defense for containers," Techdocs, Sep. 18, 2022.
Extended European Search Report mailed Dec. 19, 2023 in European Application No. 23202855.5, 8 pages.

* cited by examiner

*Primary Examiner* — Olugbenga O Idowu
(74) *Attorney, Agent, or Firm* — Law Office of Scott P. Zimmerman, PLLC

(57) ABSTRACT

A cloud-service malware detection application detects, in real time or in near real time, malware infecting cloud services. The cloud-service malware detection application monitors incoming communications, outgoing communications, API calls, and other inter-service activities conducted between different cloud services in a cloud-computing environment. Because the cloud-computing environment may have many different cloud services, the cloud-service malware detection application detects a malware attack that spans multiple hosts and cloud services. The cloud-service malware detection application adaptively profiles each individual cloud service using machine learning, thus providing quicker, more accurate, and more scalable malware detection.

20 Claims, 20 Drawing Sheets

ADAPTIVE PROFILING OF CLOUD SERVICES USING MACHINE LEARNING FOR MALWARE DETECTION

BACKGROUND

The subject matter described herein generally relates to computers, to computer security, and to computer network security and, more particularly, the subject matter relates to cyber-security adaptive profiling of distributed cloud-native services.

Cloud services are vulnerable to malicious threats. In the past, cloud environments were generally believed more resilient to cyber threats. Recently, though, cloud environments have been found to be equally prone to malware infections. Even though cloud services providers may quickly identify and remove malicious content, attackers exploit any short window of opportunity. Techniques are thus needed that detect evidence of malware in cloud services.

SUMMARY

A cloud-service malware detection application infers, in real time or in near real time, evidence of cloud malware infecting cloud services. The cloud-service malware detection application provides security by monitoring incoming communications, outgoing communications, API calls, and other inter-service activities conducted between cloud services in a cloud-computing environment. Because the cloud-computing environment may have many different cloud services implemented as bare metal machines, virtual machines, containers, and/or functions, the cloud-service malware detection application detects service anomalies as evidence of malicious events that span multiple hosts and cloud services. The cloud-service malware detection application automatically and individually profiles each cloud service, thus providing quicker, more accurate, and more scalable malware detection.

BRIEF DESCRIPTION OF THE SEVERAL VIEWS OF THE DRAWINGS

The features, aspects, and advantages of cloud services malware detection are understood when the following Detailed Description is read with reference to the accompanying drawings, wherein.

DETAILED DESCRIPTION

Figure 1:
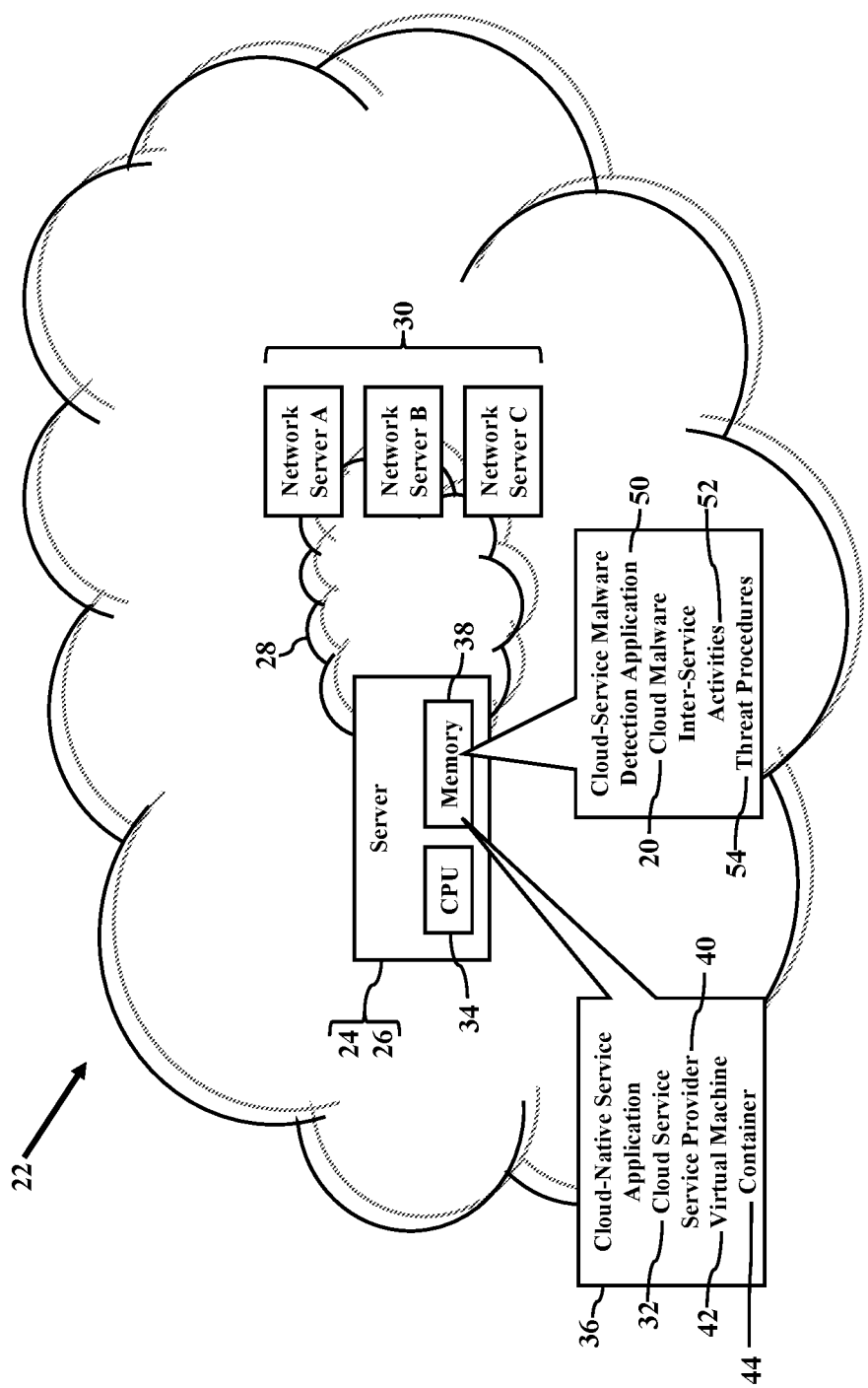
FIGS. 1-5 illustrate examples of inferring cloud malware in a cloud-computing environment.

Some examples relate to adaptive profiling of cloud services using machine learning. As cloud computing has grown, threat actors now target cyberattacks to cloud services. Cloud malware exploits a vulnerability associated with a cloud service. Examples of a cloud-service malware detection application thus monitor any cloud service and detect service anomalies as evidence of malware. A service behavioral profile is generated by a machine learning model. The service behavioral profile describes or represents normal operations of the cloud service. In some examples, the cloud-service malware detection application monitors any contemporaneous incoming communications, outgoing communications, API calls, and other inter-service activities conducted between computers, virtual machines, containers, and/or functions providing cloud services. Any inter-service activity may then be compared to the service behavioral profile. If the inter-service activity matches or conforms to the service behavioral profile, then the inter-service activity may be considered or inferred to be one normal operations of the cloud service. If, however, the inter-service activity deviates from, or fails to conform to, the service behavioral profile, then some examples may classify or infer the inter-service activity to be abnormal or unexpected service activity. The cloud-service malware detection application may flag the inter-service activity as potential evidence of cloud malware. Alerts, escalations, and other threat procedures may be implemented that protect the cloud service.

Example techniques may be implemented as a third party cloud service in any cloud-computing environment. Today's cloud-computing networks may have hundreds, or even thousands, of different and distributed, cloud services. Some examples thus also describe a third party cloud malware detection service that profiles/characterizes each different cloud service. The cloud malware detection service may be called or invoked by other cloud services in the cloud-computing environment. The cloud malware detection service identifies and trains a service-specific machine learning model using inter-service activities representing normal or expected service activities of each corresponding cloud service. Once trained, then, the cloud malware detection service specifically detects service anomalies as evidence of any malware targeted to the corresponding cloud service. So, even though examples of the cloud malware detection service may be deployed as a network cloud malware detection resource, the cloud malware detection service provides individualized, service-specific malware detection. The cloud malware detection service may thus be deployed throughout any cloud-computing environment with little or no custom coding or implementation. The cloud malware detection service is thus agnostic to the cloud service, thus quickly adapting and implementing cloud service-specific malware detection.

Examples of malware detection are easily implemented. Whatever the cloud service, any machine learning model may be used. Sample data points, or features, of normal or expected inter-service activities may be fed as inputs to the desired machine learning model. In some examples, the machine learning model may generate statistical ranges or values of these normal or expected inter-service activities. Should any contemporaneous incoming communications, outgoing communications, API calls, and other inter-service activities lie outside statistical models, then potential evidence of cloud malware has been detected and threat procedures may be implemented.

Cloud services malware detection will now be described more fully hereinafter with reference to the accompanying drawings. Cloud services malware detection, however, may be embodied in many different forms and should not be construed as limited to the examples set forth herein. These examples are provided so that this disclosure will be thorough and complete and fully convey cloud services malware detection to those of ordinary skill in the art. Moreover, all the examples of cloud services malware detection are intended to encompass both structural and functional equivalents thereof. Additionally, it is intended that such equivalents include both currently known equivalents as well as equivalents developed in the future (i.e., any elements developed that perform the same function, regardless of structure).

FIGS. 1-5 illustrate some examples of inferring cloud malware 20 in a cloud-computing environment 22. A computer 24 operates in the cloud-computing environment 22. FIG. 1 illustrates the computer 24 as a server 26. The computer 24, though, may be any processor-controlled device, as later paragraphs will explain. In this example, the server 26 communicates via a communications network 28 (e.g., public Internet, private network, and/or hybrid network) with other servers, devices, computers, or other network members 30 operating within, or affiliated with, the cloud-computing environment 22. The server 26 is programmed to provide one or more cloud services 32 to the network members 30 of the cloud-computing environment 22. The server 26 thus has a hardware processor 34 (illustrated as "CPU") that executes a cloud-native service application 36 stored in a memory device 38. The cloud-native service application 36 may be a computer program, instruction(s), or code that instructs or causes the server 26 to provide the cloud service 32, perhaps on demand, on behalf of a service provider 40. The cloud-native service application 36 may be executed by, or associated with, a virtual machine 42. The cloud-native service application 36, in particular, may be packaged as an isolated container 44 that contains all of the necessary elements to provide the cloud service 32. The cloud-native service application 36, for simplicity, is thus known as a containerized service 32 and 44. The cloud-computing environment 22 delivers hosted cloud-native services, like storage, servers, and application services, via the communications network 28 (such as the Internet). Various implementations of a cloud-computing environment 22 are possible and could be used in the examples herein described.

The cloud malware 20 may infect the cloud-computing environment 22. The cloud malware 20 exploits a vulnerability associated with the cloud service 32. As a simple example, suppose that the cloud service 32 runs as the container 44 in the distributed AMAZON® Web Services platform. If any electronic data stored in an AMAZON SIMPLE STORAGE SERVICE® (or "AMAZON S3®") storage container bucket gets compromised, the cloud service 32 could be commanded to setup a malicious AWS LAMBDA® service. This malicious service may copy and steal the electronic data from the AMAZON S3 ® storage container bucket and exfiltrate the electronic data to an unauthorized network destination. The cloud malware 20 may thus cause a security breach that threatens the accuracy/confidentiality/integrity of the cloud service 32. The cloud malware 20 may further jeopardize the performance and functioning of the hardware processor 34 and the memory device 38. Simply put, the cloud service 32 must be monitored against attacks by the malicious cloud malware 20.

FIG. 1 thus illustrates an example of a cloud-service malware detection application 50. The cloud-service malware detection application 50 detects, in real time or in near real time, anomalies as evidence of the cloud malware 20. In this simple example, FIG. 1 illustrates the cloud-service malware detection application 50 installed to, and locally stored by, the server 26. The cloud-service malware detection application 50 may be integrated into the container 44 that packages the cloud service 32. However, the cloud-service malware detection application 50 may be implemented as its own containerized cloud malware detection service. Regardless, in this example, the cloud-service malware detection application 50 interfaces with, and perhaps supervises, the cloud-native service application 36. The cloud-service malware detection application 50 monitors any events, communications, and activities associated with the cloud service 32. The cloud-service malware detection application 50, in particular, monitors and approves/denies inter-service activities 52 conducted by the container 44 (e.g., the cloud-native service application 36 providing the cloud service 32). If the inter-service activities 52 indicate evidence of the cloud malware 20, the cloud-service malware detection application 50 may automatically implement notification/quarantine/isolation/halt or other threat procedures 54 that protect the server 26 and the cloud-computing environment 22.

Figure 2:
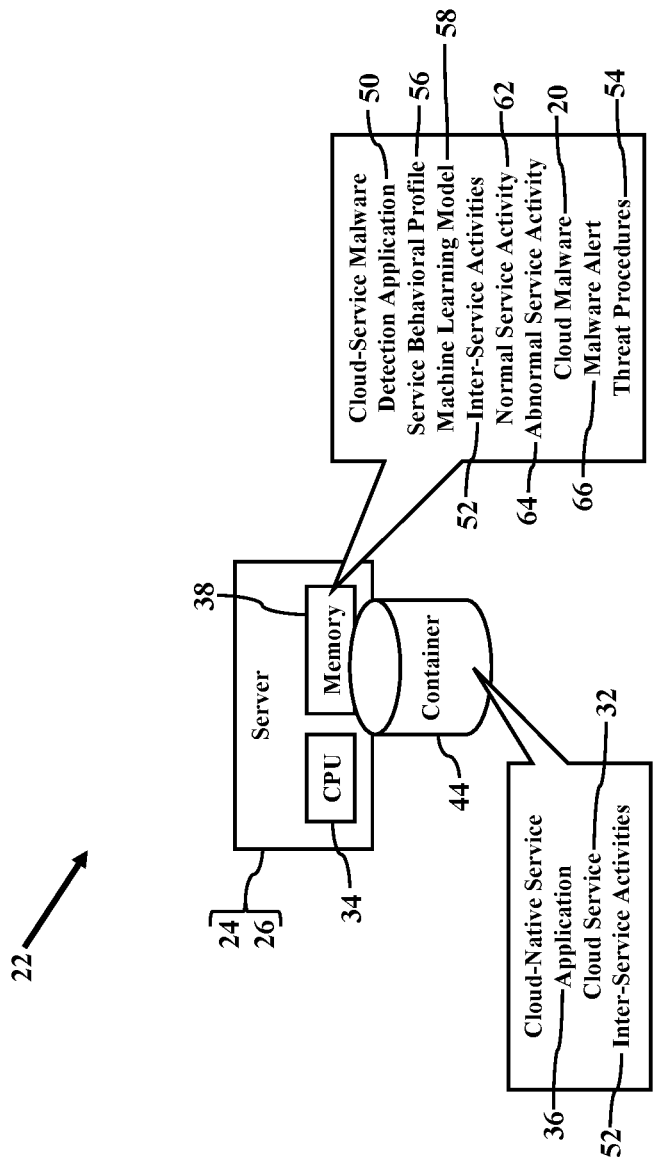
Figure 3:
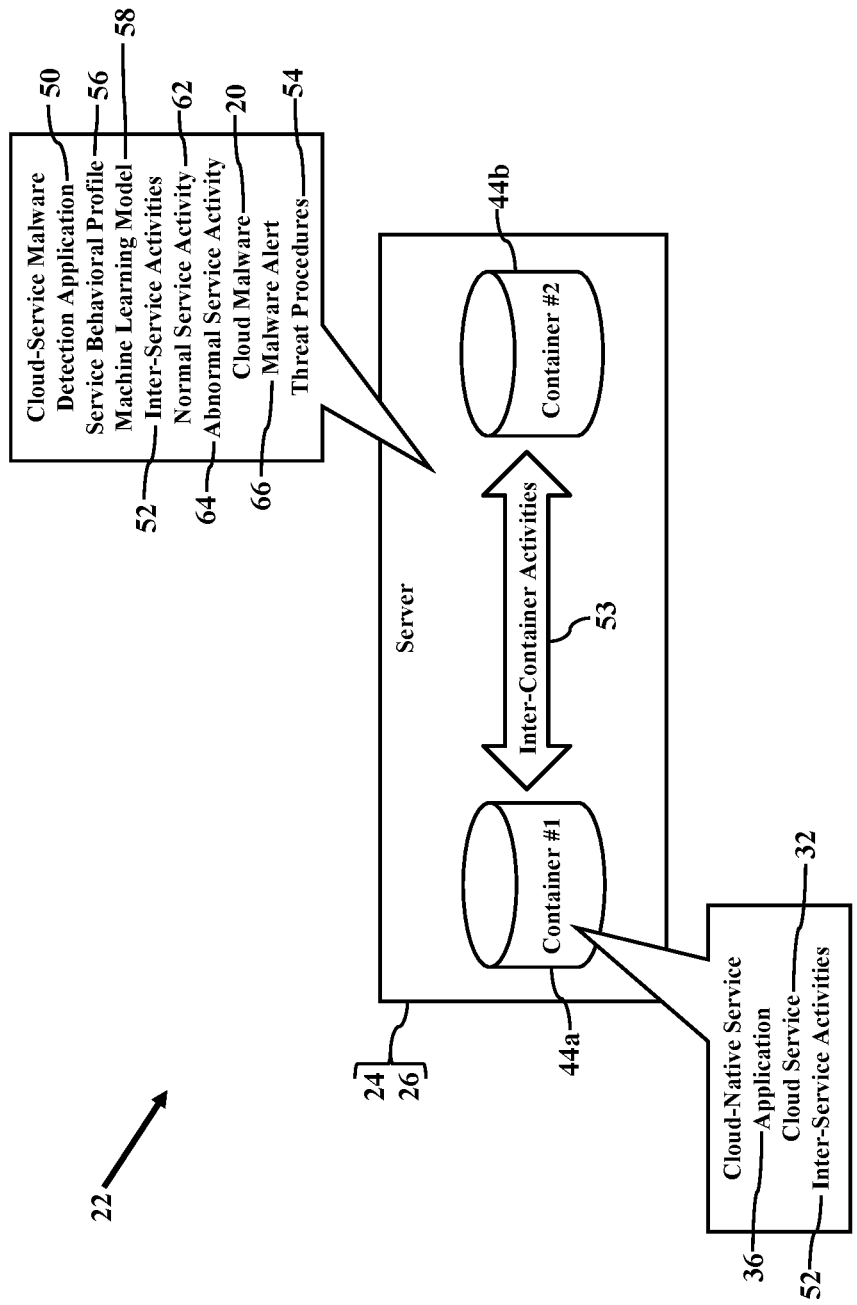
Figure 4:
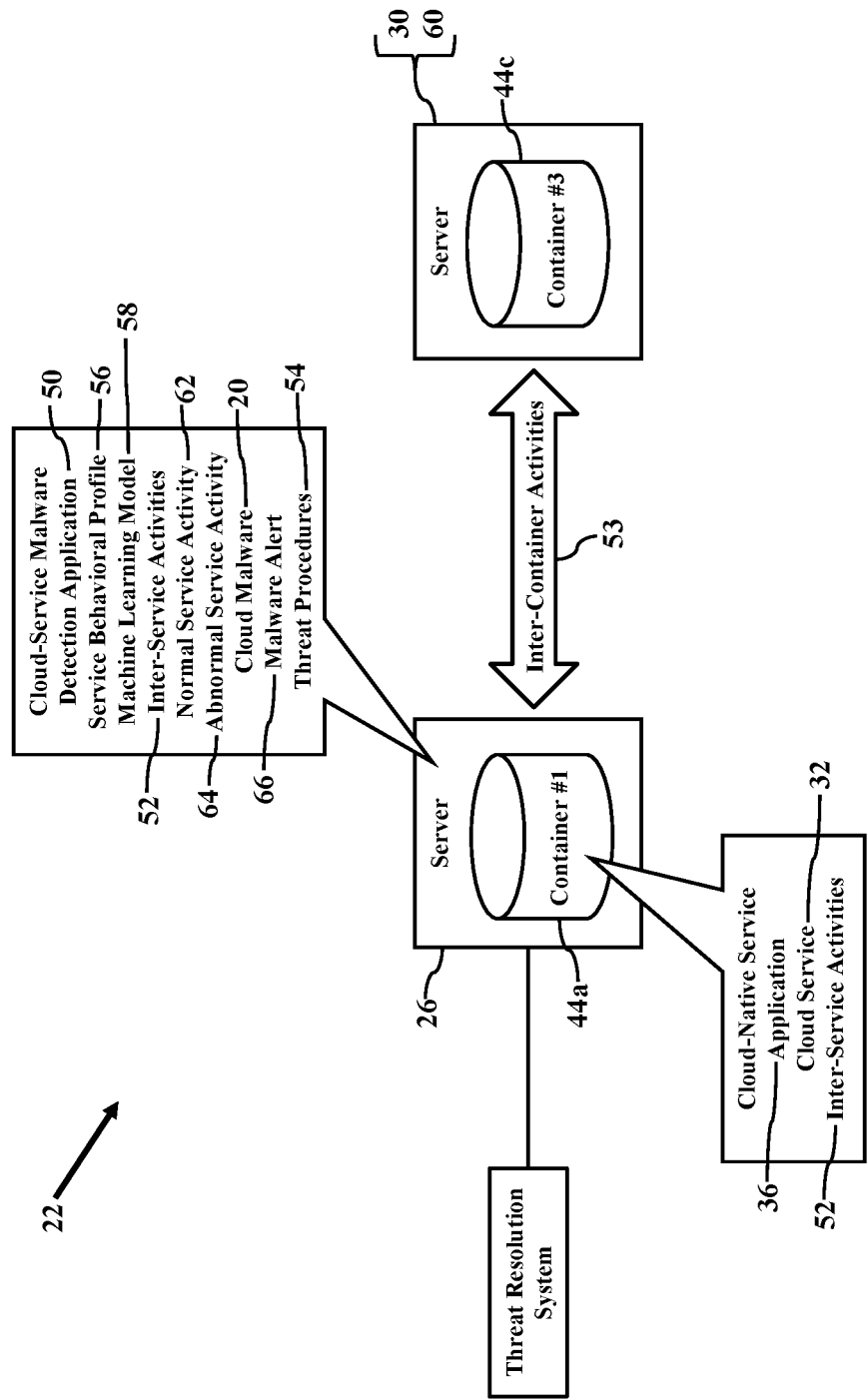

FIGS. 2-4 further illustrate examples of cloud services malware detection. An example of the cloud-service malware detection application 50 uses a service behavioral profile 56 to detect the cloud malware 20. As FIG. 2 illustrates, the service behavioral profile 56 is automatically and autonomously generated by a machine learning model 58 that interfaces with, or is integrated with, the cloud-service malware detection application 50. The cloud-service malware detection application 50 may monitor the contemporaneous inter-service activities 52 conducted by the cloud-native service application 36 providing the cloud service 32. In FIG. 3, for example, the cloud-service malware detection application 50 monitors the inter-service activities 52 conducted between different containers (illustrated as reference numerals 44a and 44b) that are co-hosted by the server 26. In FIG. 4, though, the cloud-service malware detection application 50 monitors the inter-service activities 52 conducted (via the communications network 28 illustrated in FIG. 1) between different containers 44a and 44c hosted by different network nodal members (illustrated as servers 26 and 60). The cloud-service malware detection application 50 may thus monitor and supervise the inter-container activities 53 conducted between different containerized services 32 and 44. Whatever the containerized architecture, the cloud-service malware detection application 50 compares any inter-service activity 52 to the service behavioral profile 56. If the inter-service activity 52 matches or conforms to the service behavioral profile 56, then the cloud-service malware detection application 50 may permit or allow the inter-service activity 52 to continue or to execute. The inter-service activity 52, in other words, may be classified as normal or expected service activity 62 conducted while providing the cloud service 32. If, however, the cloud-service malware detection application 50 determines that the inter-service activity 52 deviates from, or fails to match, the service behavioral profile 56, then the cloud-service malware detection application 50 may classify the inter-service activity 52 as an anomaly or unexpected service activity 64. The cloud-service malware detection application 50, in other words, may flag the inter-service activity 52 as potential evidence of the cloud malware 20. The cloud-service malware detection application 50 may thus generate and send a malware alert notification 66 to any notification addresses that initiate further investigation. The cloud-service malware detection application 50 may also implement the predefined threat procedures 54 that protect the cloud-computing environment 22.

Any threat notification scheme may be used. When the cloud-service malware detection application 50 detects the cloud malware 20, the cloud-service malware detection application 50 may implement the threat procedures 54. The cloud-service malware detection application 50, for example, may instruct its host machine (such as the server 26) to generate and to send the malware alert notification 66 to predefined notification addresses. The malware alert notification 66 may be any message, webpage/website/social posting, and/or SMS text. Whatever the notification method, the malware alert notification 66 may have any electronic content describing the inter-service activity 52 (such as the inter-container activity 53) that is the suspected cloud malware 20. The cloud-service malware detection application 50 may be programmed or coded to include far more detailed escalation actions. For simplicity, though, FIG. 4 illustrates a procedural hand-off to a threat resolution system that is more specifically programmed to inspect or resolve the cloud malware 20.

Other actions may be implemented. When the cloud-service malware detection application 50 detects evidence of any malicious event (e.g., the cloud malware 20), operations may be implemented or executed that quarantine the cloud service 36. Operations may additionally or alternatively include quarantining the host machine (such as the server 26). Operations may additionally or alternatively include terminating the container 44 (e.g., the cloud-native service application 36 providing the cloud service 32). Service orchestration software may additionally or alternatively be instructed or commanded to remove the container 44 from the cloud computing environment 22. Because evidence of the cloud malware 20 has been detected, any actions may be implemented that isolate the offending cloud service 36 to protect the cloud computing environment 22.

Figure 5:
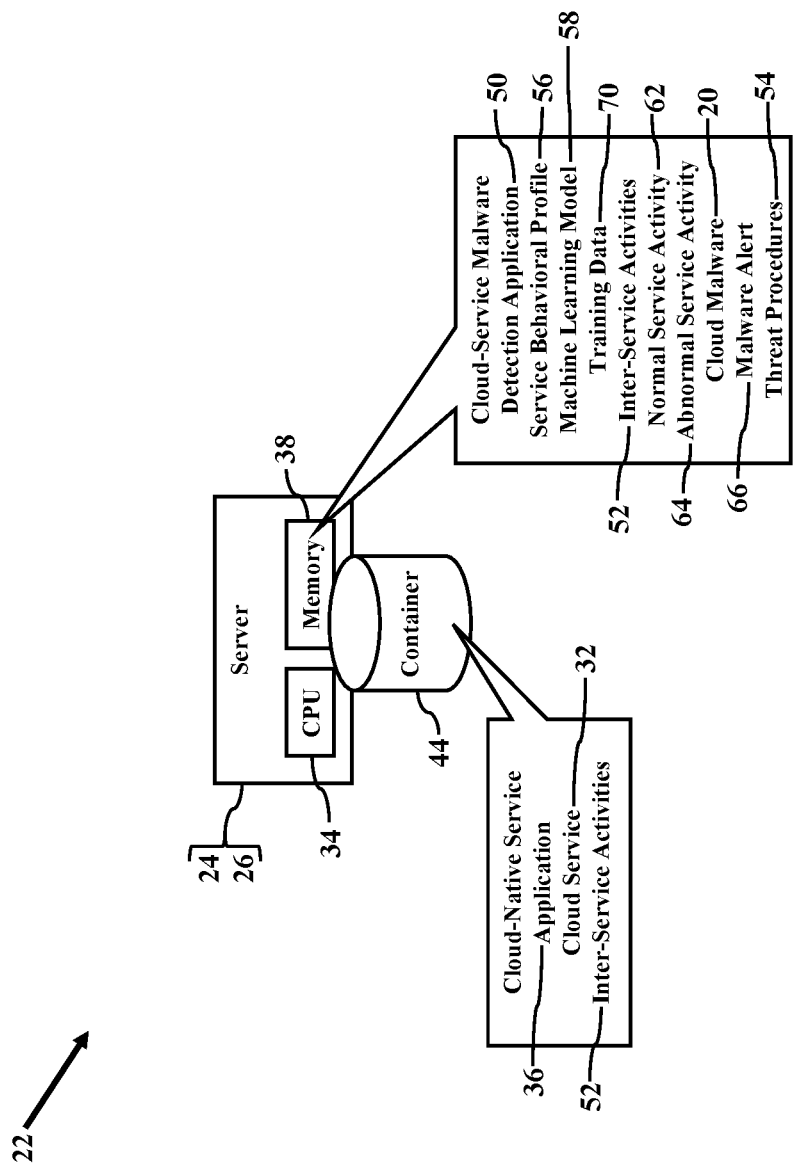

FIG. 5 further illustrates examples of quickly detecting the cloud malware 20. The cloud-service malware detection application 50 may initially train the machine learning model 58 to recognize, or to predict, many different features or indicators of the normal or expected service activities 62. In these examples, the machine learning model 58 may be trained with cloud service training data 70 representing the normal or expected service activities 62. The cloud service training data 70 describes actual, known, and/or normal activities that should be, or have been, conducted by the cloud-native service application 36 providing the cloud service 32. The cloud service training data 70 may be extracted from actual samples, attributes, calls, events, parameters, and/or ranges of values that have been historically observed/logged as uncorrupted or unaffected by the cloud malware 20. The cloud service training data 70 is input to the machine learning model 58, and the machine learning model 58 learns and builds one or more statistical models that describe, expand, and/or predict the normal or expected service activities 62 conducted by the cloud-native service application 36. The cloud-service malware detection application 50, in other words, may autonomously and automatically generate the cloud-service behavioral profile 56 that describes, or characterizes, the inter-service activities 52 conducted by the cloud-native service application 36. The cloud-service malware detection application 50 may monitor the contemporaneous inter-service activities 52 conducted by the cloud-native service application 36. The cloud-service malware detection application 50 may then compare the contemporaneous inter-service activities 52 to the cloud-service behavioral profile 56. Any contemporaneous inter-service activity 52 that conforms to the cloud-service behavioral profile 56 may be quickly permitted/allowed to execute or proceed.

Predictions may be made. Because the machine learning model 58 may build a statistical model, the machine learning model 58 may statistically predict a range of the normal or expected service activities 62. As a simple example, the machine learning model 58 may generate the cloud-service behavioral profile 56 using Gaussian probability distributions based on the cloud service training data 70. One or more standard deviations and confidence intervals may then be calculated to predict ranges of the normal or expected service activities 62. As the cloud-service malware detection application 50 inspects the inter-service activities 52, the statistical models may be used to predict that any inter-service activity 52 lies within, or deviates or differs from, the cloud-service behavioral profile 56. The cloud-service malware detection application 50 may thus classify the inter-service activity 52 as the abnormal or unexpected service activity 64 and, thus, the suspected cloud malware 20. The cloud-service malware detection application 50 may then cause the cloud-native service application 36, and/or the server 26, to nearly instantaneously stop/halt/terminate the offending inter-service activity 52. Indeed, the cloud-service malware detection application 50 may even disable the entire cloud service 32. The cloud-service malware detection application 50 may further generate the malware alert notification 66 that is sent (via the communications network 28) to any destination/recipient network address. The cloud-service malware detection application 50 thus autonomously and quickly protects the cloud-computing environment 22 from the cloud malware 20.

The cloud-service malware detection application 50 provides many improvements to computer functioning. The cloud-service behavioral profile 56, for example, is autonomously and automatically generated by the cloud-service malware detection application 50 invoking the machine learning model 58. Conventional malware detection solutions use manually-generated profiles that are exceptionally laborious to create and slow to implement. Manually-generated profiles, in plain words, are simply too complicated to humanly complete, as hundreds or even thousands of rules must be coded. In practice, then, manually-generated profiles are too simple and incomplete, thus causing conventional malware detection products to under catch, or over catch, the cloud malware 20. Moreover, conventional malware detection schemes train machine learning models with threat data. That is, conventional schemes train machine learning models to identity or predict malware using known, previously discovered vulnerability traits. These conventional schemes, in other words, fail to detect new or unknown vulnerabilities that can wreak havoc on the cloud service 32. The conventional schemes must also repeatedly retrain the machine learning models to recognize the latest-discovered threat. The cloud-service malware detection application 50, in contradistinction, trains the machine learning model 58 with the normal or expected service activities 62 conducted by the cloud-native service application 36. If any inter-service activity 52 deviates from the cloud-service behavioral profile 56, the inter-service activity 52 may be immediately classified as suspicious and flagged as the cloud malware 20. The cloud-service malware detection application 50 thus need not have a priori knowledge of any event or activity caused by any threat. The cloud-service malware detection application 50 maintains the accuracy/integrity of the cloud service 32, and the cloud-service malware detection application 50 prevents malware-degraded hardware and memory performance of the computer 24.

Figure 6:
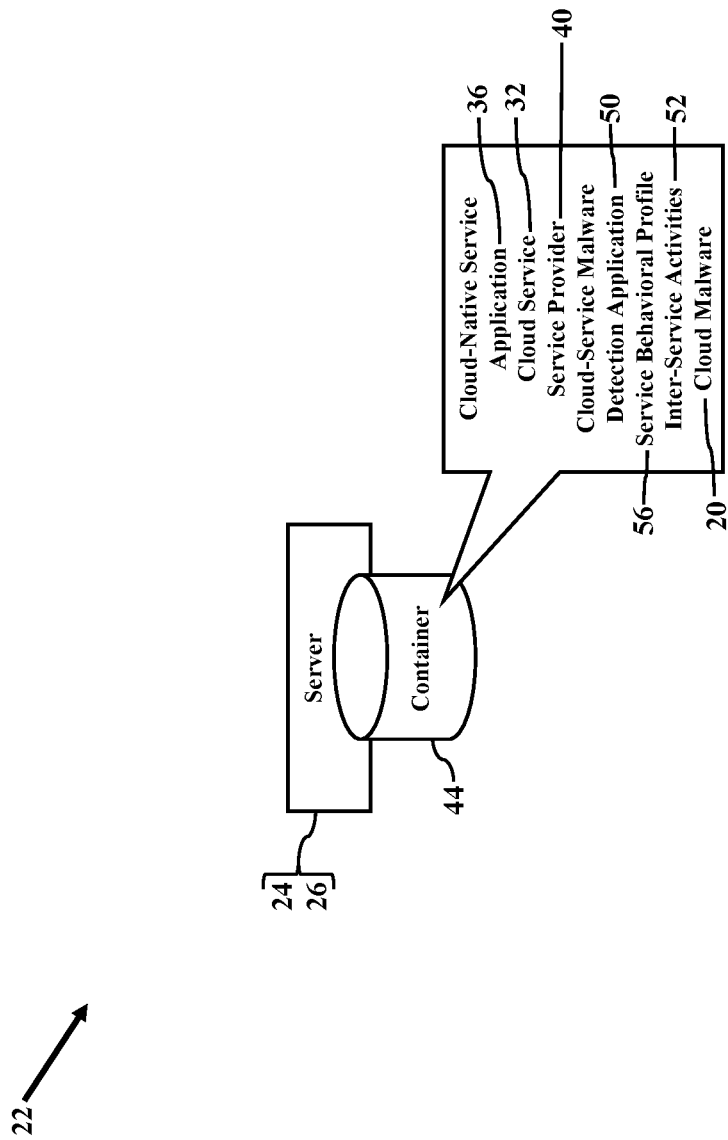
FIGS. 6-8 illustrate examples of containerized architectures.
Figure 7:
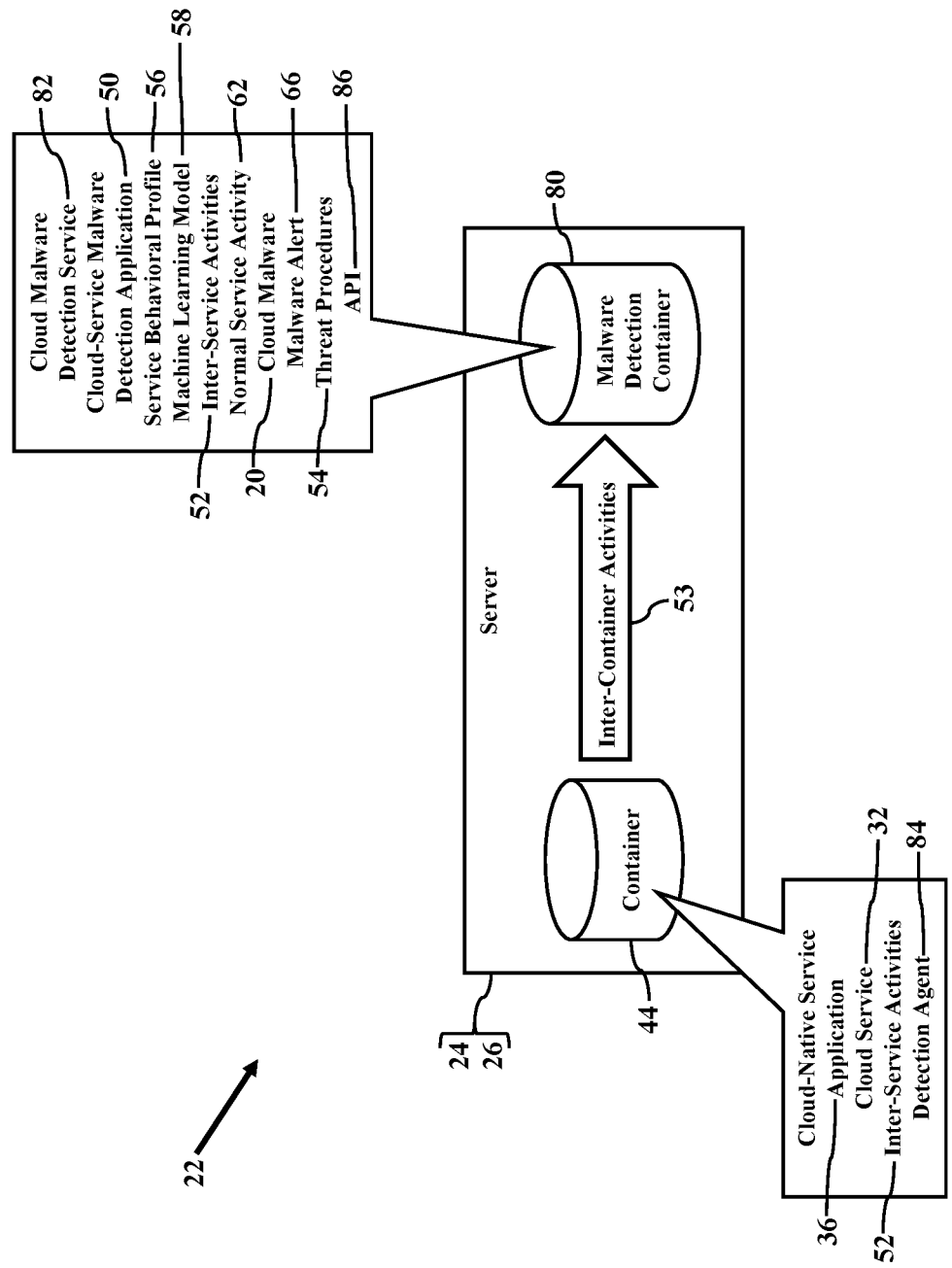
Figure 8:
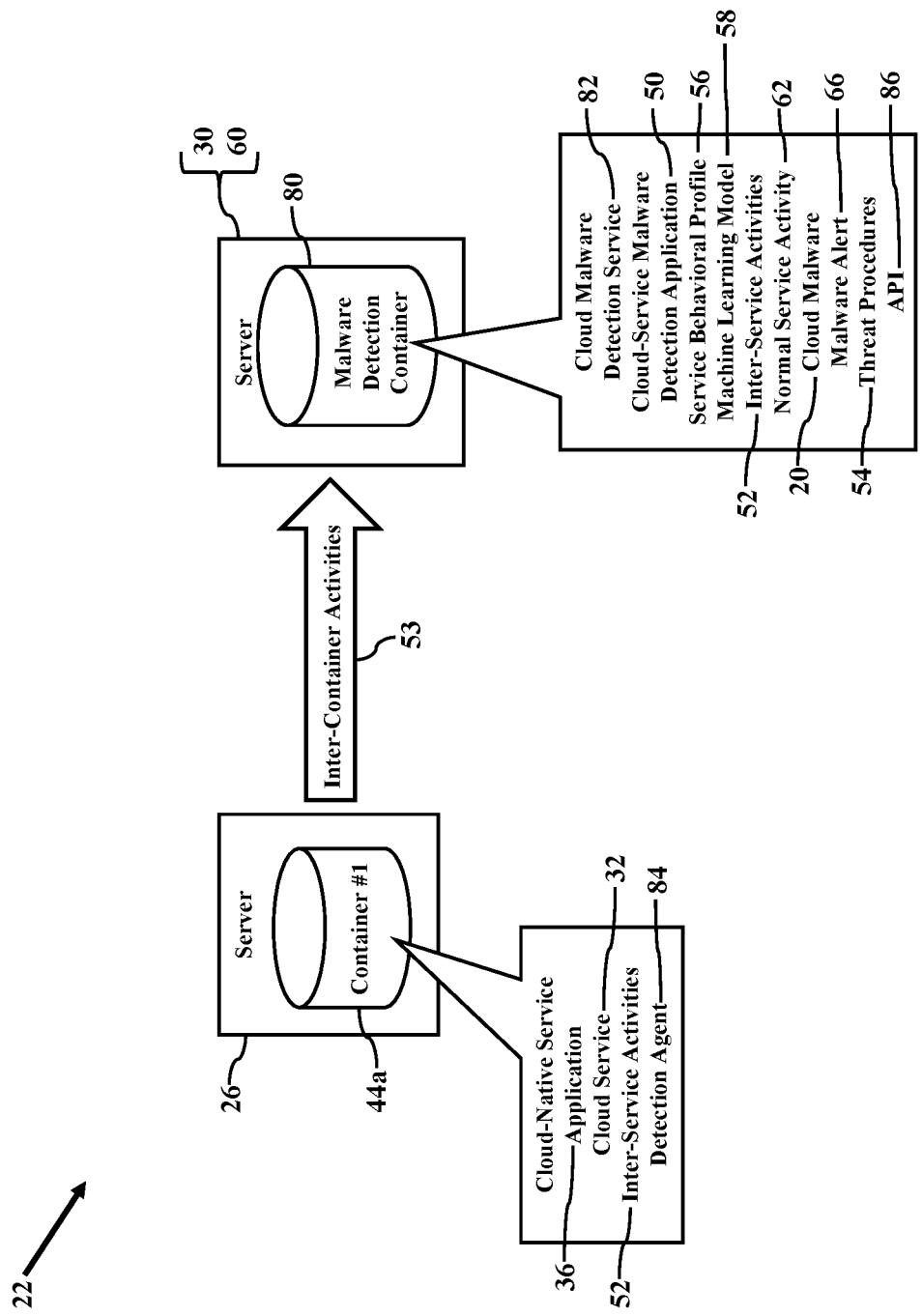

FIGS. 6-8 illustrate more examples of containerized architectures. FIG. 6, for example, illustrates a container-integration approach to malware detection. The cloud-service malware detection application 50, in other words, may be integrated with the container 44 that packages the cloud-native service application 36 providing the cloud service 32. The cloud-service malware detection application 50, in particular, may be installed into, inserted into, added to, or imported into the container 44 that packages or contains the cloud-native service application 36 providing the cloud service 32. The service provider 40 (of the cloud service 32) codes the cloud-service malware detection application 50 into the cloud-native service application 36. The cloud-service malware detection application 50 receives or intercepts the inter-service activities 52 and processes according to the service behavioral profile 56. The service provider 40 may thus manage the lifecycle of the cloud service 32, including the cloud-service malware detection application 50.

FIGS. 7-8, though, illustrate examples of hosted service solutions. The cloud-service malware detection application 50 may be packaged as its own malware detection container 80 providing a cloud malware detection service 82. The cloud-service malware detection application 50 may be packaged to contain all of its necessary elements to provide the cloud malware detection service 82. The malware detection container 80, for example, packages the service behavioral profile 56 generated by the machine learning model 58 based on the normal service activities 62. When evidence of the cloud malware 20 is determined/predicted, the malware detection container 80 may also package the code generating the malware alert notification 66 and other threat procedures 54. In FIG. 7, the malware detection container 80 (providing the cloud malware detection service 82) may be co-hosted by the server 26 that also hosts the different cloud service 32. In FIG. 8, though, the malware detection container 80 is hosted by the different network member 30 (illustrated as the server 60) operating within, or affiliated with, the cloud-computing environment 22. The cloud-service malware detection application 50, packaged as the malware detection container 80, may be separate/remote network resource/service that may be invoked by any network member 30 of the cloud-computing environment 22.

A detection agent 84 may inform the malware detection container 80. The detection agent 84 cooperates with the cloud-native service application 36 providing the cloud service 32. The detection agent 84 may have code or instructions that cause the server 26, and/or the cloud-native service application 36 (providing the cloud service 32), to read or intercept the inter-service activities 52 (such as the inter-container activities 53) conducted by the container 44. The service provider 40 may install or add the detection agent 84 to an operating system executed by the server 26. The service provider 40 may additionally or alternatively install or add the detection agent 84 to the cloud-native service application 36 providing the cloud service 32. The malware detection container 80 may expose its application programming interfaces ("APIs") 86 for calling/requesting the cloud malware detection service 82. The detection agent 84 invokes the APIs 86 and may instruct or cause its host server 26 to send or transfer the inter-service activities 52 (via the communications network 28 illustrated in FIG. 1) to the network IP address representing the malware detection container 80, the cloud malware detection service 82, and/or the cloud-service malware detection application 50. The detection agent 84, in plain words, may send a request specifying the cloud malware detection service 82 based on the inter-service activities 52. The malware detection container 80 may provide the cloud malware detection service 82. If evidence of the cloud malware 20 is detected, the cloud-service malware detection application 50 may send the malware alert notification 66 and may implement the threat procedures 54.

Figure 9A:
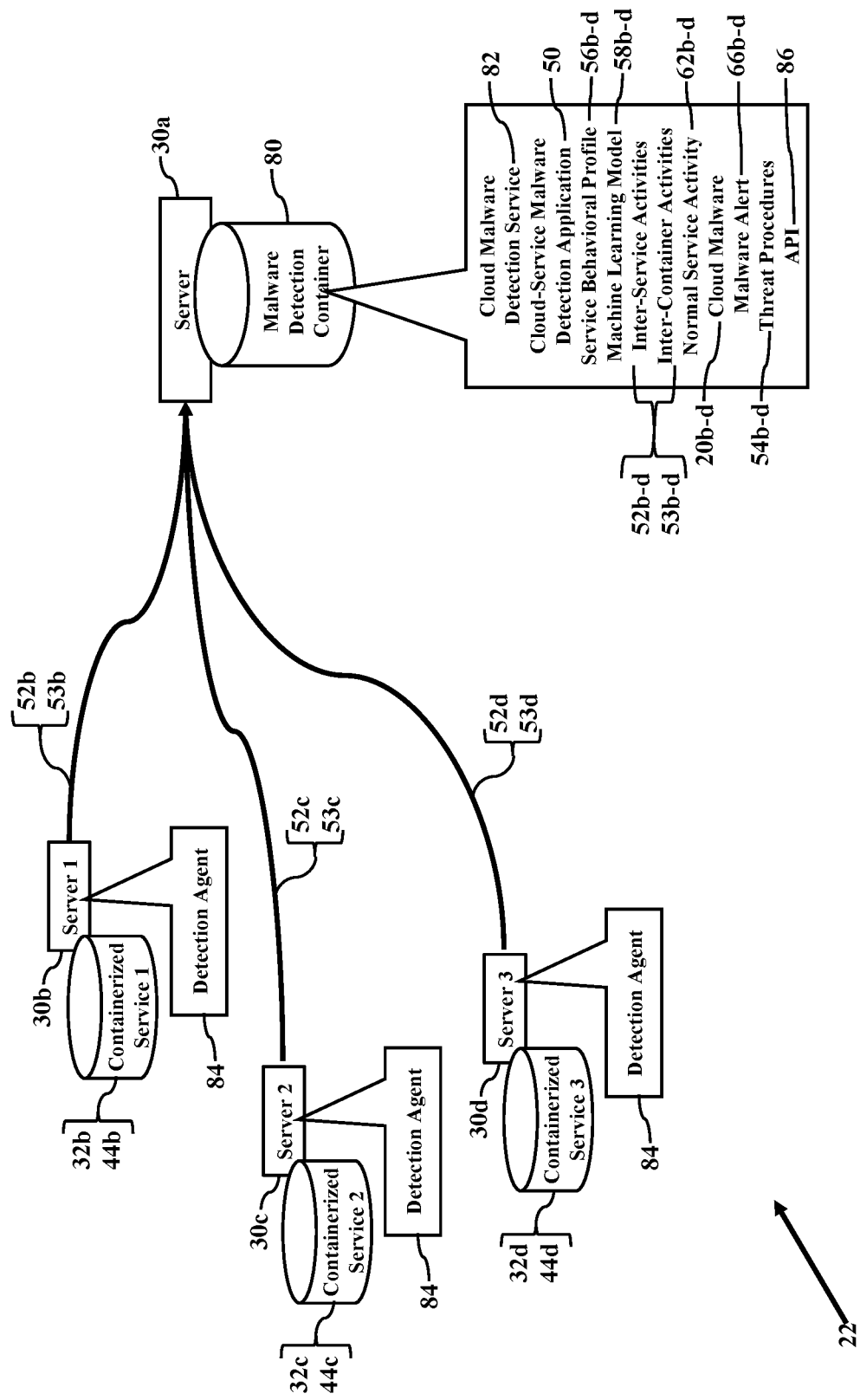
FIGS. 9A & 9B illustrate more examples of containerized architectures.
Figure 9B:
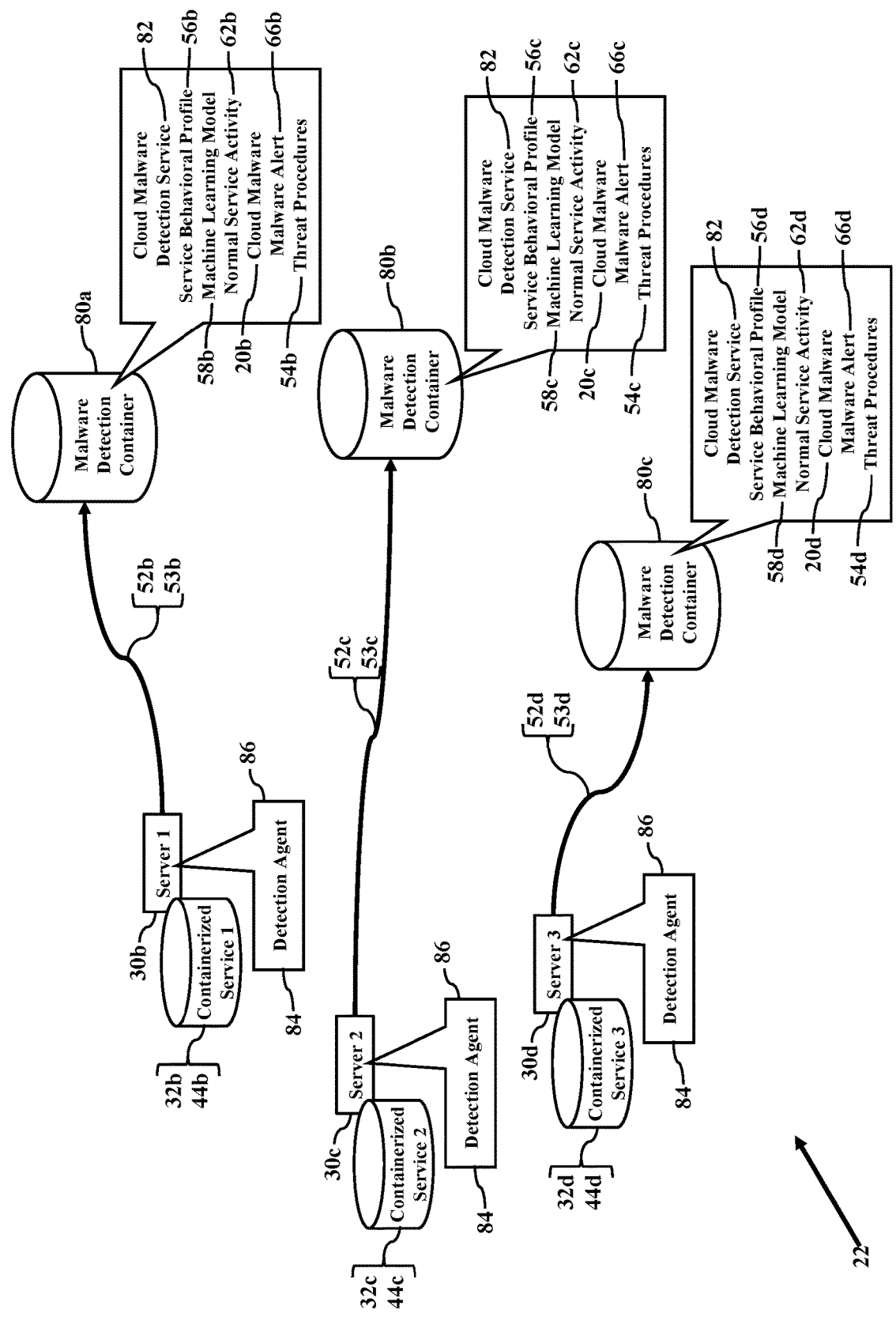

FIGS. 9A-9B illustrate more examples of containerized services architectures. The cloud-computing environment 22 may have many, perhaps even hundreds, of different and distributed, containerized cloud services 32. Such a complicated architecture is too difficult to illustrate. FIG. 9A, then, simply illustrates four (4) network members 30a-d providing their corresponding containerized cloud services 32a-d and 44a-d. In FIG. 9A, network member 30a, in particular, hosts the malware detection container 80 providing the cloud malware detection service 82.

In FIG. 9B, though, the cloud malware detection service 82 may utilize multiple malware detection containers (illustrated as reference numerals 80a-c). Because the cloud-computing environment 22 may implement many hundreds or more of distributed, containerized cloud services 32, such a large service architecture may overwhelm the performance capabilities of a single malware detection container 80. Indeed, packet congestion, network delays, and timing/performance objectives may require the installation of multiple and distributed malware detection containers 80a-c to adequately serve the needs of the cloud-computing environment 22.

The cloud malware detection service 82 monitors the cloud services 32. The network members 30b-d may each store and execute an instance of the detection agent 84. Each instance of the detection agent 84 may instruct the corresponding network member 30b-d to invoke the APIs 86 and to report its corresponding inter-service/inter-container activities 52b-d and 53b-d (via the communications network 28 illustrated in FIG. 1) to the network IP address associated with the malware detection container 80 providing the cloud malware detection service 82. The malware detection container 80 provides the cloud malware detection service 82, based on the corresponding service behavioral profile 56b-d that is associated with the containerized cloud service 32b-d. Each containerized cloud service 32b-d, in other words, may have its unique service behavioral profile 56b-d, generated based on historical observations of the corresponding normal service activity 62b-d. Indeed, the cloud malware detection service 82 may be configured to utilize different machine learning models 58b-d that are predetermined or pre-selected according to the containerized cloud service 32b-d. The cloud malware detection service 82 may thus be trained to detect different cloud malware 20b-d, again depending on the corresponding containerized cloud service 32b-d. The cloud malware detection service 82 may be additionally configured with different malware alert notifications 66b-d and different threat procedures 54b-d, again depending on the corresponding containerized cloud service 32b-d. The cloud malware detection service 82 may thus be customized according to the containerized cloud service 32b-d.

Figure 10:
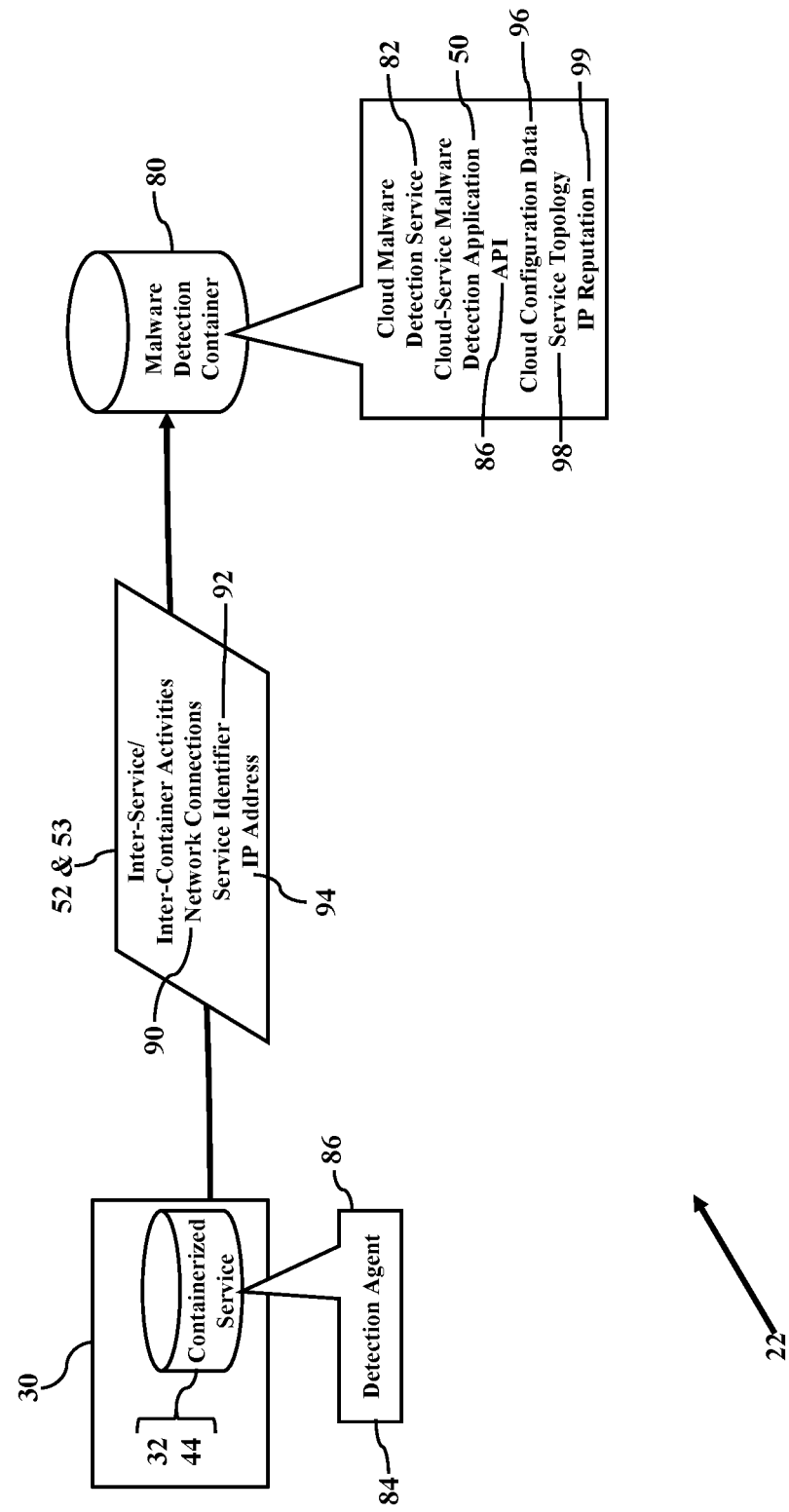
FIGS. 10-11 illustrate examples of inter-service activities monitored by a cloud-service malware detection application.
Figure 11:
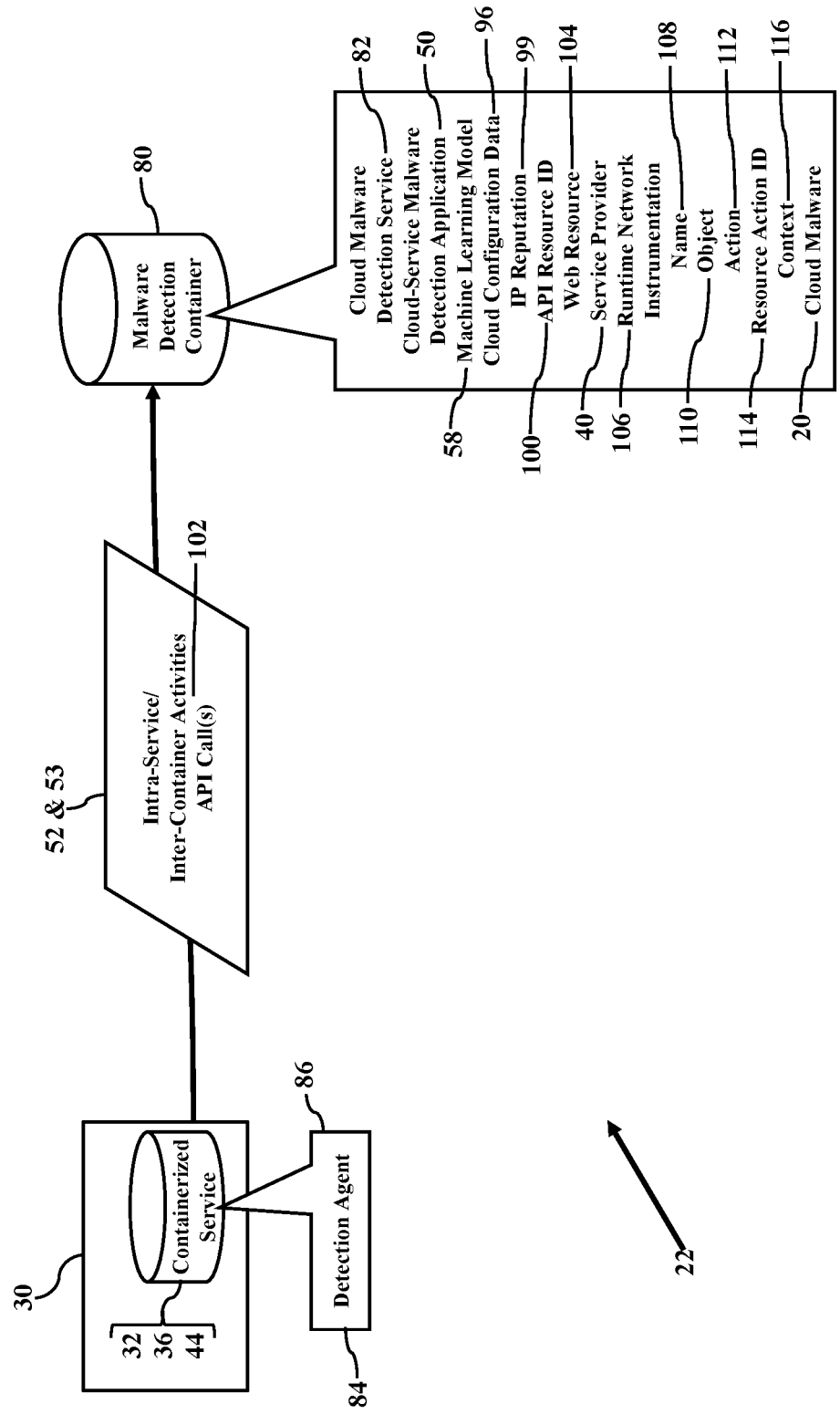

FIGS. 10-11 illustrate examples of the inter-service activities 52 that may be monitored by the cloud-service malware detection application 50 and/or the cloud malware detection service 82. The cloud-computing environment 22 may provide thousands or even millions of distributed containers 44, with each different container 44 specializing in a corresponding cloud service 32. Each container 44 may package a single function that performs a specific task (sometimes referred to as a "microservice"). Large, complicated software applications may thus be broken up into much smaller, and more specialized, cloud services 32. As this disclosure above explained, though, such a complicated architecture is too difficult to illustrate. FIGS. 10-11 thus simply illustrate two (2) containerized services 32/44 and 80/82. Whatever cloud service 32 is provided by the container 44, the detection agent 84 may report the corresponding inter-service activities 52 and/or the inter-container activities 53 (via the communications network 28 illustrated in FIG. 1) to the network IP address representing the malware detection container 80 packaging the cloud malware detection service 82. The detection agent 84 may request the cloud malware detection service 82 using the APIs 86, as above explained.

As FIG. 10 illustrates, the inter-service activities 52 may include network connections 90. As the containerized cloud service 32 operates, the cloud-service malware detection application 50 may monitor and inspect the incoming/outgoing inter-service/inter-container activities 52 and/or 53 conducted to/from the container 44. For example, each container 44 is assigned to, and associated with, a unique cloud service identifier 92 and an Internet Protocol address 94. As the containerized cloud service 32 and 44 operates, communications are established with other containers and services. The hosting network member 30, the cloud service 32, and/or the detection agent 84 may report the network connections 90, the service identifiers 92, and/or the Internet Protocol addresses 94 to the malware detection container 80 packaging the cloud malware detection service 82. The cloud-service malware detection application 50 may inspect one, some, or all of these inter-service activities 52 and identify or classify the corresponding cloud service 32. The cloud-service malware detection application 50 may read, or generate, logs describing input data sent to other containers 44, output data received from other containers 44, their corresponding Internet Protocol addresses 94, and/or cloud service identifiers 92. The cloud-service malware detection application 50 may read or log inter-container and/or inter-host requests, responses, replies, events, activities, their corresponding Internet Protocol addresses 94, and/or cloud service identifiers 92. The cloud-service malware detection application 50 may query and retrieve these inter-container Internet Protocol addresses 94 and cloud service identifiers 92 from cloud configuration data 96 provided by AWS®, GOOGLE®, MICROSOFT®, or any other cloud-service provider hosting the cloud-computing environment 22. Because the container 44 is configured to talk to incoming and to outgoing external container services, the cloud-service malware detection application 50 may identify the external container 44 by reading the cloud configuration data 96 describing inter-container communications.

The network connections 90 allow identity inferences. The network connections 90, for example, allow the cloud-service malware detection application 50 to distinguish between an IP address for an object store API, an IP address of a local host, and an IP address of a computer on a network. Furthermore, the cloud-service malware detection application 50 may distinguish between an internal application or a public IP address. The Internet Protocol address 94 and cloud service identifier 92 may even quickly and easily identify other categories of services (such as a SALES-FORCE® API or a SLACK® messaging service). The cloud-service malware detection application 50 may identify and/or classify the cloud service identifier 92 by monitoring the inter-service network connections 90 between the different containers 44 and the cloud services 32. Any method or network data may be used to infer service identities.

The cloud-service malware detection application 50 may also identify a service topology 98. The cloud-service malware detection application 50 may consult public/private domain name service (DNS) records to further identify and classify the cloud service identifier 92. For example, once any IP address is determined (such as the IP address 94 assigned to the container 44), the cloud-service malware detection application 50 may query a DNS database lookup and identify, retrieve, or infer the corresponding URL domain, cloud service 32, and/or service provider 40. The DNS records may thus quickly and easily further reveal the service topology 98 attempted by any container 44. As another example, cloud service providers publish ranges of IP addresses that correspond to cloud services 32. These ranges of IP addresses may be retrieved and compared to the IP address 94 assigned to the container 44, thus identifying the cloud service 32 and/or service provider 40. As yet another example, Internet Protocol reputations 99 may be retrieved and used to identify IP addresses associated with bulk spam, malware, dangerous domains, or suspicious locations (e.g., poor IP reputations). Again, though, any method or network data may be used to infer service identities.

FIG. 11 illustrates more examples of the inter-service activities 52. The cloud-service malware detection application 50 may generate and monitor an API resource identification 100. Again, the cloud-computing environment 22 may deploy thousands or even millions of different containers 44, with each container 44 providing a corresponding cloud micro-service 32. Each container 44 may thus be associated with application programming interfaces (or "APIs") that defines protocols for using the native cloud service 32 provided by the container 44. The hosting network member 30, the cloud service 32, and/or the detection agent 84 may report incoming and outgoing API calls 102 to the malware detection container 80 packaging the cloud malware detection service 82. By analyzing the incoming and outgoing API calls 102 made by the cloud service 32, the API resource identification 100 reveals the web resource 104 called by the cloud service 32 and the service provider 40.

The cloud-service malware detection application 50 may thus generate and monitor a runtime network instrumentation 106. The cloud-service malware detection application 50 may generate the runtime network instrumentation 106 by identifying the API call 102 and by accessing and using publicly-available details about the API call 102. For example, suppose that the container 44 (e.g., the cloud-native service application 36) issues an HTTP REST API call 102. Because the packet headers in the HTTP portion are visibly available, the cloud-service malware detection application 50 may read the HTTP portion and identify the URL hosting the API resource. The IP reputation 99 associated with the URL host may identify malicious threat actors. Furthermore, using deep packet inspection of the inter-container HTTP traffic with the URL host, the cloud-service malware detection application 50 may identify that the container 44 is communicating with the particular web resource 104 (such as SALESFORCE®) and making a modification to the web resource 104. As another example, encrypted network traffic may also be inspected and identified. The detection agent 84 may inspect packet headers in HTTPS traffic (such as by using the extended Berkeley Packet Filter or eBPF) to extract and identify security observability data. In other words, the cloud-service malware detection application 50 may obtain fine-grained details of the API call 102 and determine the API resource identification 100, even from encrypted traffic. The API resource identification 100 may thus reveal the cloud malware 20 attempting a rogue resource modification.

The cloud-service malware detection application 50 may encode other information. The cloud-service malware detection application 50 may be programmed to include details regarding all, some, or commonly used API calls 102. These API details allow the cloud-service malware detection application 50 to distinguish between different API calls 102 (such as REST API call from a Graph QL call). Amazon's AWS®, for example, offers hundreds of different API calls 102. The cloud-service malware detection application 50 may be coded to include fine details regarding all, or a popular or common subset, of these AWS® API calls 102. These fine details may be retrieved from the cloud configuration data 96 (such as Amazon's AWS® specification) and provide a deep knowledge of the resource exposed by the API call 102. These fine details, for example, may reveal a name 108, an object 110, and an action 112 associated with the API call 102. These fine details may be incorporated into the API resource identification 100, thus providing a rich-data description of the inter-container API calls 102 associated with the container 44 providing the cloud service 32.

The cloud-service malware detection application 50 may generate a resource action identification 114. The cloud-service malware detection application 50 may generate the resource action identification 114 by semantically translating the action 112 (revealed by the API resource identification 100) using a context 116. As a very simple example, suppose the action 112 associated with the API call 102 is defined by the word "create." Using the fine details describing the API call 102 (perhaps obtained from Amazon's, Google's, or Microsoft's cloud-computing service specification), the cloud-service malware detection application 50 may identify the API call 102 as a creation of a resource from its context 116. If the context 116 is an AMAZON S3® bucket, the resource action identification 114 identifies the corresponding semantics and a single action 112. If, however, the context 116 is a SALESFORCE® service, then the context 116 may have different semantics. The resource action identification 114, as constructed perhaps over time and usage, is a rich glossary of semantics associated with API calls 102 and their corresponding name 108, object 110, and action 112.

The cloud-service malware detection application 50 greatly improves cloud services malware detection. The cloud-service malware detection application 50 may define the machine learning model 58 to identify anomalies from inter-container and inter-host network traffic logs that provide service level details. The cloud-service malware detection application 50 thus need not have a priori knowledge of any threat event or activity. The cloud-service malware detection application 50 may use statistical approaches to identify anomalies for any cloud service 32. The normal service activities 62 may be defined based on the historical service logs, and the features or indicators of the normal service activities 62 may be defined in terms of the service identifiers 92 and their inter-service/inter-container/inter-host interactions without looking into the operations performed. The cloud-service malware detection application 50 may thus train the machine learning model 58 to identify anomalies using the features or indicators of the normal service activities 62. The cloud-service malware detection application 50 may then be deployed per-container 44, and/or per-service 32, for monitored cloud services 32. Each container/service instance of the cloud-service malware detection application 50 gets differently trained to identify container-specific/service-specific anomalies (or threats). The cloud-service malware detection application 50 may thus generate the unique service behavioral profile 56 for each distributed cloud service 32. Because the cloud-service malware detection application 50 may use statistical approaches, the cloud-service malware detection application 50 may statistically predict if a cloud service operation (in terms of the service identity 92) is considered anomalous. Once any anomaly is detected, the cloud-service malware detection application 50 may flag the potential cloud malware 20, generate the malware alert notification 66, and/or alert downstream services for further investigation and/or response actions. The cloud-service malware detection application 50 may thus be a very workload-focused solution to detect threats. The cloud-service malware detection application 50 resolves the conventional problem of scale, as customers need not manually create and validate profiles. The cloud-service malware detection application 50 detects threats in terms of the high level entities (such as the above example of the malicious AWS LAMBDA® function). The cloud-service malware detection application 50 may apply machine learning and statistical modeling to individual cloud-native services based on service identities in the context of containerized applications. The cloud-service malware detection application 50, however, may also apply machine learning and statistical modeling to non-containerized cloud services/applications.

The cloud-service malware detection application 50 provides more improvements to computer functioning. The cloud-service malware detection application 50 provides malware protection to distributed cloud-native computing services. The cloud-service malware detection application 50 predicts the cloud malware 20 by detecting anomalous inter-service activities 52 conducted between different containerized services 32 and even by different inter-host network members 30. The cloud-service malware detection application 50 may generate the cloud-service behavioral profile 56 based on inter-service/inter-container incoming and outgoing network communications 90, the API calls 102, and other inter-service activities 52 conducted between the different containers 44 providing the different cloud services 32 distributed in the cloud-computing environment 22. The cloud-service malware detection application 50 detects anomalies in the context of the cloud services 32 utilizing each other. The cloud-service malware detection application 50 operates in a domain of the inter-service/inter-container communications 90, API calls 102, and other inter-service activities 52 that are deployed on multiple computer hosts 30 distributed in the cloud-computing environment 22. Conventional malware detection schemes focus on signals within a single host, which misses an attack that spans over multiple hosts 30. The cloud-service malware detection application 50 detects anomalies in a much bigger picture with context—i.e., an attack that spans over multiple hosts and the context being the cloud services 32 involved in the attack. Indeed, by analyzing the API calls 102, the cloud-service malware detection application 50 provides insights into the behavior of the cloud-native service application 36 (providing the cloud service 32), again at a big picture level. Conventional malware detection schemes, for example, only monitor and analyze local system calls at the host level. Because the cloud-service malware detection application 50 profiles based on inter-service/inter-container communications, API calls 102, and other inter-service activities 52, the examples of the cloud-service malware detection application 50 provide greater and more useful malware detection in a distributed services system.

Figure 12:
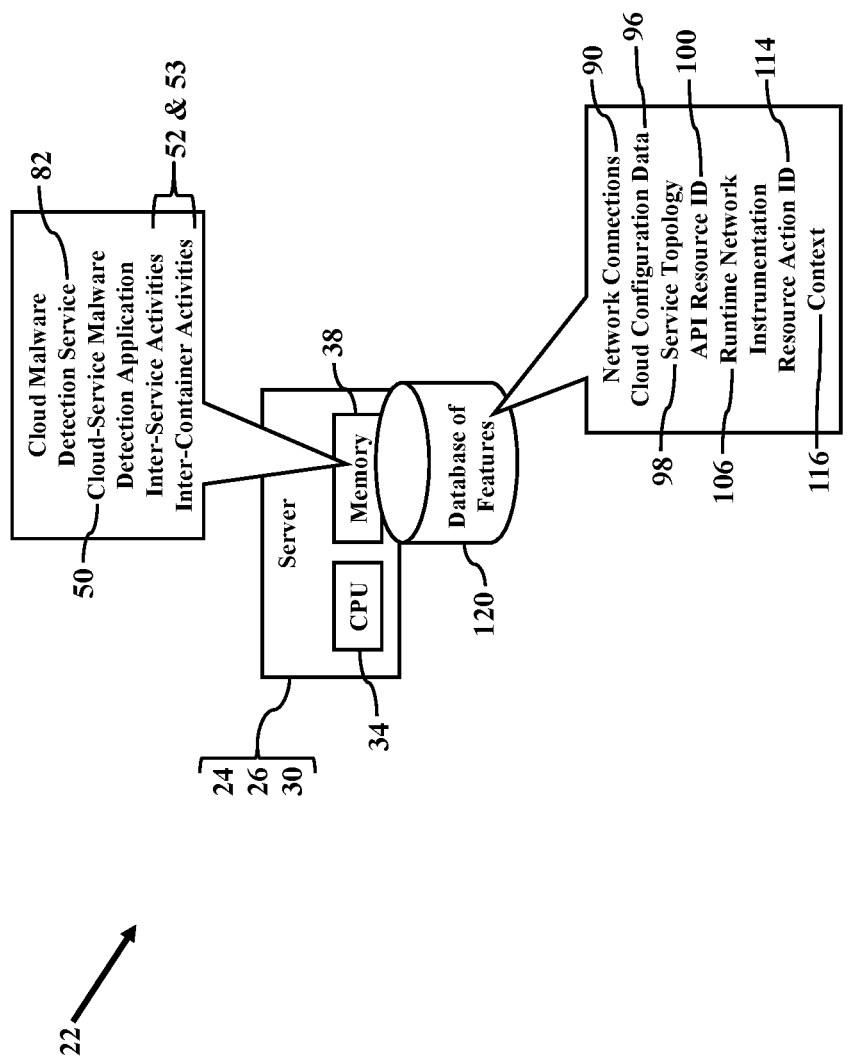
FIGS. 12-13 illustrate examples of feature extraction.
Figure 13:
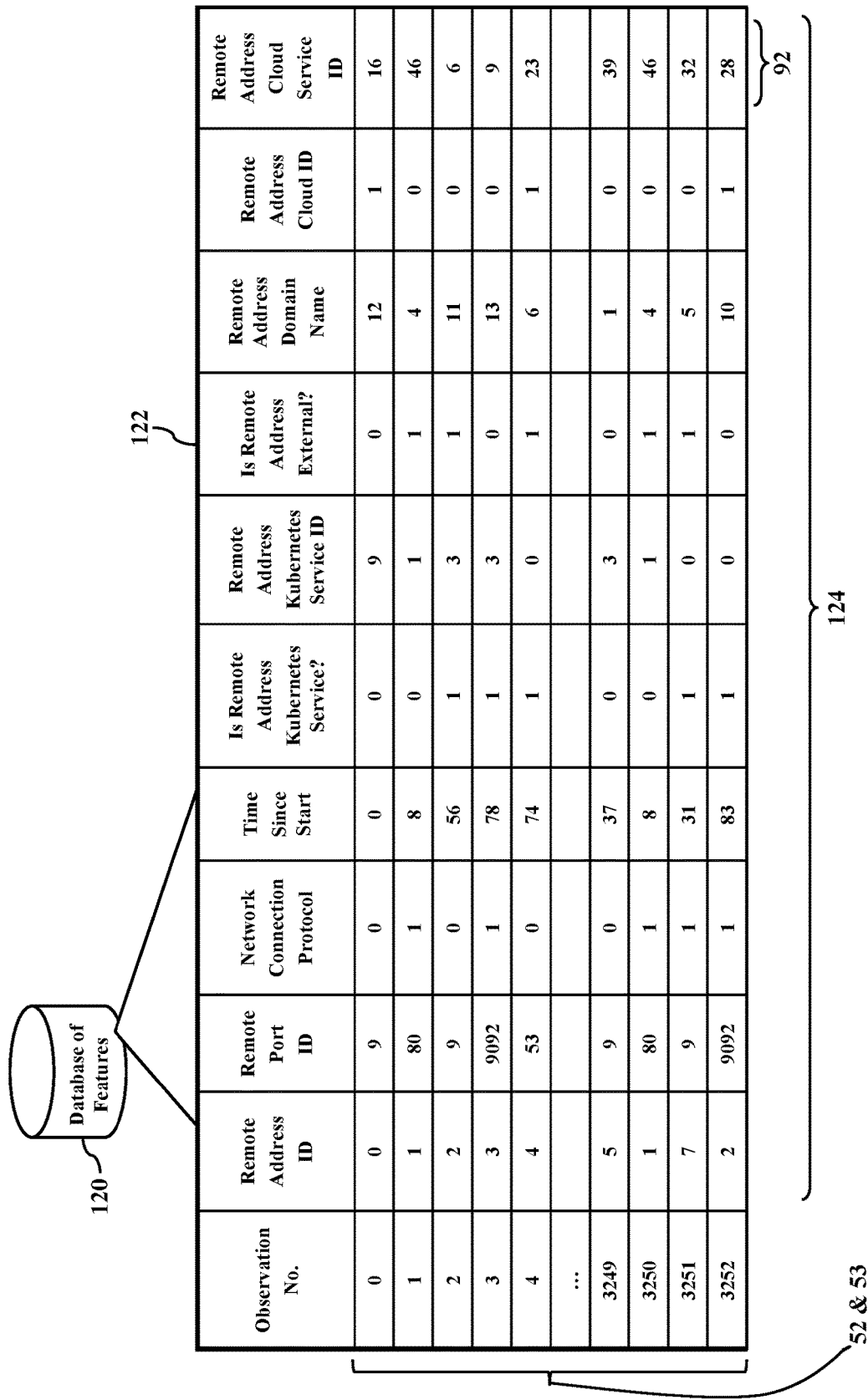

FIGS. 12-13 illustrate examples of feature extraction. The cloud-service malware detection application 50 has access to a rich data description of the inter-service/inter-container activities 52 and 53 conducted by any containerized service (illustrated as reference numerals 32 and 44 in FIGS. 1-11). The cloud-service malware detection application 50, for example, may query databases storing the inter-service and/or inter-host network connections 90, the cloud configuration data 96, and the service topology 98. The cloud-service malware detection application 50 may also access databases storing the API resource identification 100, runtime network instrumentation 106, the resource action identification 114, and/or the context 116. The inter-service/inter-container activities 52 and 53 identify what inter-container cloud services 32 and network connections 90 are being invoked. The cloud-service malware detection application 50 may thus store or log any or all of this data in an electronic database 120 of features. FIG. 12 illustrates the database 120 of features as being stored in the memory device 38 of the computer 24 (such as the server 26) hosting the cloud malware detection service 82. The database 120 of features may optionally be remotely stored and accessed/queried by any other network member of the cloud computing environment 22. Even though the database 120 of features may have any logical structure, a relational database is perhaps easiest to understand. FIG. 13 thus illustrates the database 120 of features as table 122 having row and columnar entries that map, relate, or associate different operational observations of the inter-service/inter-container activities 52 and 53 to their corresponding features 124. The features 124, in other words, have been extracted from the data describing the inter-service/inter-container activities 52 and 53. These extracted features 124 may then be used to train the machine learning model 58 (as previously explained with reference to FIG. 5).

The extracted features 124 may vary based on circumstances, experience, results, time, cost, and other factors. Actual prototype testing extracted the features 124 over several thousand observations. In actual practice, though, millions of observations may be recorded. FIG. 13 thus illustrates the truncated table 122 having many entries removed for clarity and simplification. Each row represents an observed inter-service/inter-container activity 52 and 53, and each columnar entry represents a corresponding feature 124. The extracted features 124, for example, may describe a remote address ID, a remote port ID, and the network connection protocol (such as TCP or UDP) associated with the corresponding inter-container cloud service 32. Other columnar entries may further describe a timing parameter, whether the cloud service 32 is a remote KUBERNETES® service and its service ID, an external indication, a domain name, a cloud indication, and the cloud service identifier 92. Again, in actual practice, the table 122 may have millions of observations depending on a desired accuracy, budget, and other objectives.

The extracted features 124 reveal many details. The extracted features 124, for example, may identify whether the external cloud service 32 is local (e.g., stored/co-hosted and executed by the server 26) or remotely accessed via the communications network 28. If the external cloud service 32 is local, the extracted features 124 may reveal whether the external cloud service 32 is deployed on the same compute cluster or deployed in a different compute cluster. The extracted features 124 may reveal whether the external cloud service 32 is a KUBERNETES® service and, if so, the identification for that particular KUBERNETES® service. The extracted features 124 may reveal a domain name for a particular IP address and, from that domain, distinguish between an API endpoint and another cloud network.

The extracted features 124 may include temporal components. The inter-service activities 52 may change with the passage of time. Any of the inter-service activities 52, then, may have an initial value at an initial time to, a current value at a current time t, and perhaps a final value at a final or end time $t_f$. The cloud service 32, then, may startup and initially conduct many connections/communications 90 and other inter-service activities 52 with external containers 44. As time passes, though, later phases of execution may cease some or most inter-service activities 52. The extracted features 124 capture these details.

Figure 14:
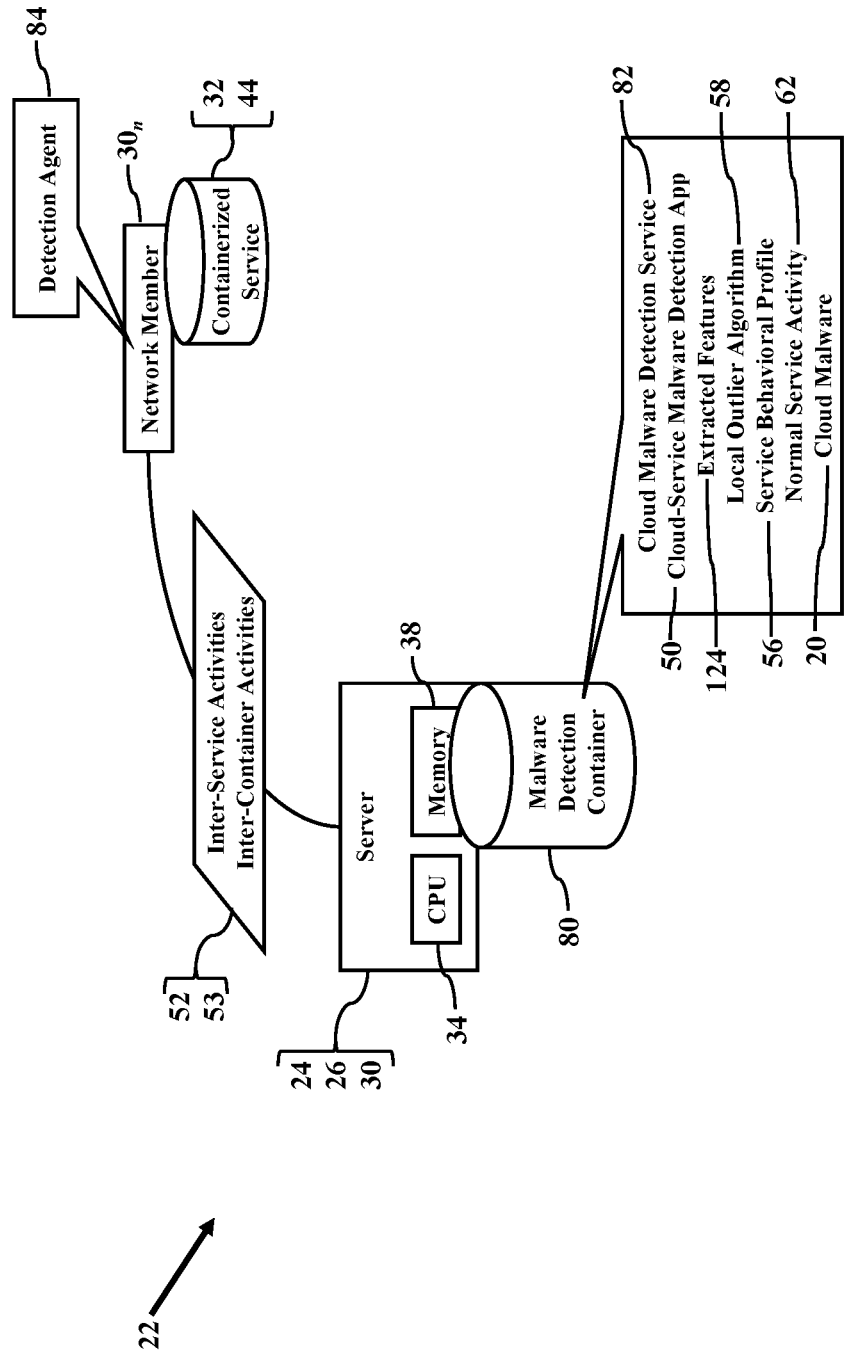
FIG. 14 illustrates a prototype example of adaptive profiling of cloud services using machine learning.

FIG. 14 illustrates a prototype example of cloud services malware detection. Now that the features 124 have been extracted, the machine learning model 58 may be trained to identify or predict the cloud malware 20. The features 124 (extracted from the inter-service activities 52) represent the historical observations of the normal or expected service activities (illustrated as reference numeral 62 in FIGS. 2-5 & 7-9) reported by the legitimate cloud service 32. The cloud-service malware detection application 50 may thus train the machine learning model 58 to recognize statistical ranges or values of these features 124 and even unknown values. The machine learning model 58 thus automatically, autonomously, and internally embeds the service behavioral profile 56 profiling the normal or expected service activity 62. The cloud-service malware detection application 50, of course, may implement a custom machine learning model that is specifically tailored and coded for cloud-computing services.

The prototype example was constructed. The prototype example was coded using a LINUX® Virtual Machine on an APPLE® MACBOOK® having an INTEL® hardware processor 34. The setup consisted of a distributed application running as containers in a KUBERNETES® cluster deployed on a single virtual machine. Alongside the targeted distributed application, the prototype example was also running the malware detection container 80 as the cloud malware detection service 82 on the same cluster. Of course, the cloud-service malware detection application 50 may utilize any other KUBERNETES® cluster implementation (e.g., AWS®, GOOGLE®, MICROSOFT®). Each host in the cluster executed products from https://cilium.io/as the detection agent that provides network visibility into the network traffic on the host that originates from the containerized service 32 and 44. The prototype malware detection container received the inter-service activities 52 from the cilium products, extracted the features 124, and trained the machine learning model 58 with the extracted features 124 for the sending containerized service 32 and 44. There are many other vendors and technologies that provide network visibility, and the cloud-service malware detection application 50 may interface with any vendor's product acting as the detection agent 84.

The prototype example, though, was conceptually proven using publicly-available resources. While any machine learning model 58 or scheme may be used, the prototype example was implemented using the Local Outlier Factor programs available from the https://www.scikit-learn.org project. These programs allowed the inventor to quickly and inexpensively implement the machine learning model 58 and to conceptually prove the cloud-service malware detection application 50. Again, though, any machine learning and statistical models may be used to detect normal and anomalous activities. Any classification models may also be used to classify/categorize normal and abnormal activities. Whatever models are used, the model(s) 58 are trained with the features 124 extracted from the observed inter-service activities 52. Once trained, the machine learning model 58 analyzes unseen or unknown service interactions. If the statistical models predict the inter-service/inter-container activities 52/53 as anomalous, the cloud-service malware detection application 50 detects the cloud malware 20.

Figure 15:
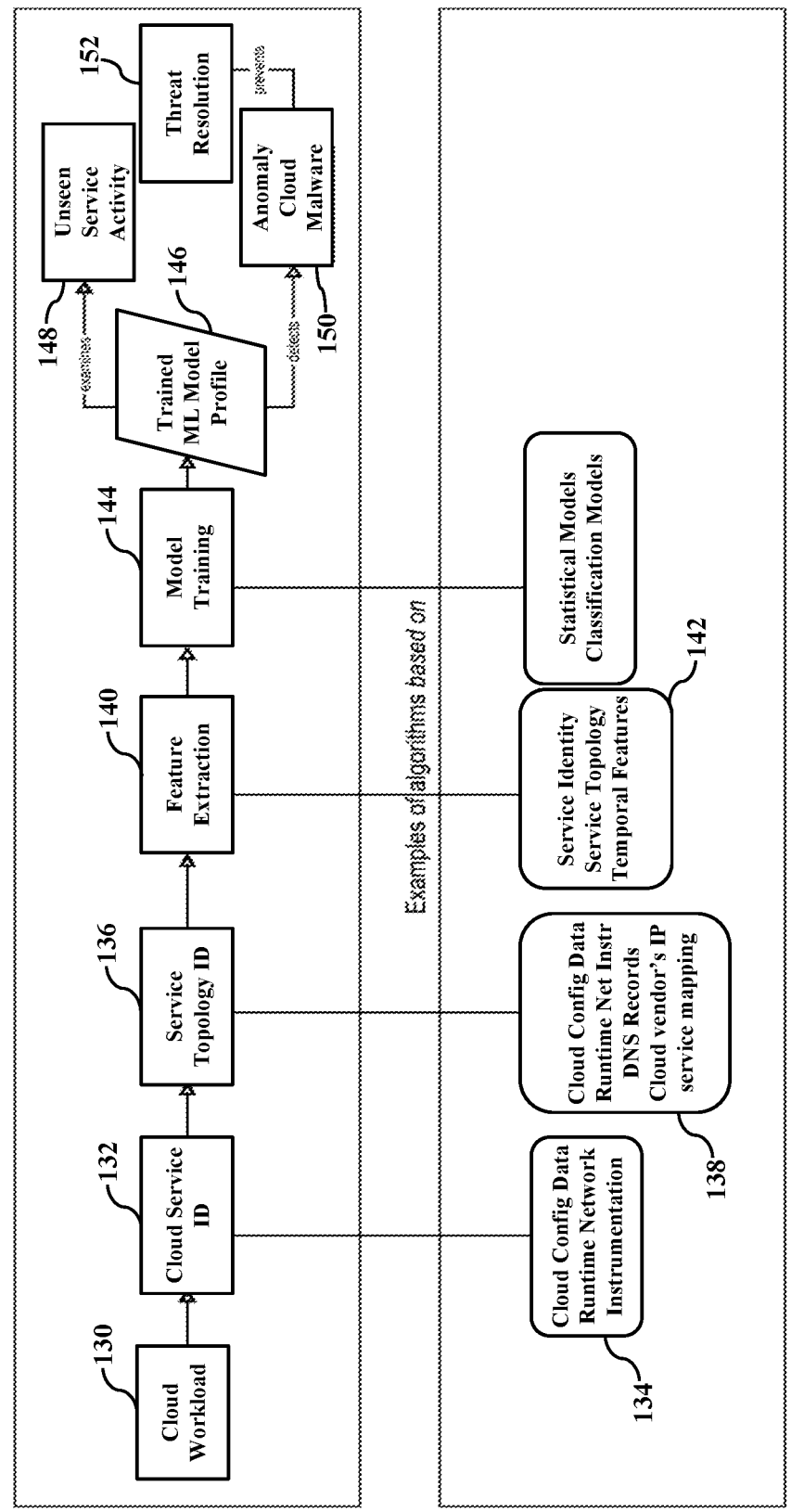
FIG. 15 illustrates an example of a method for detecting cloud malware.

FIG. 15 illustrates an example of a method for detecting the cloud malware 20. The cloud-service malware detection application 50 receives the inter-service/inter-container activities 52/53 (as reported by the detection agent 84) performed by the monitored cloud workload (Block 130). The cloud workload represents the monitored cloud service 32 whose service behavioral profile 56 has been generated. The cloud service identifier 92 is determined (Block 132), perhaps by accessing the cloud configuration data 96 and the runtime network instrumentation 106 (Block 134). The service topology identification 98 is performed (Block 136), perhaps using the cloud configuration data 96, the runtime network instrumentation 106, public DNS records, and the cloud service provider's IP service mapping data (Block 138). The features 124 are extracted (Block 140), perhaps using the cloud service identifiers 92, the service topology identification 98, and/or temporal features of the inter-service/inter-container activities 52/53 (Block 142). The machine learning model 58 is trained with the features (Block 144) and the service behavioral profile 56 is generated (Block 146). The cloud-service malware detection application 50 may thus examine the contemporaneous inter-service activities 52 and distinguish between unseen, but normal, service activity (Block 148) and the abnormal cloud malware 20 (Block 150). Any abnormal cloud malware 20 triggers the threat procedures 54 (Block 152).

Figure 16:
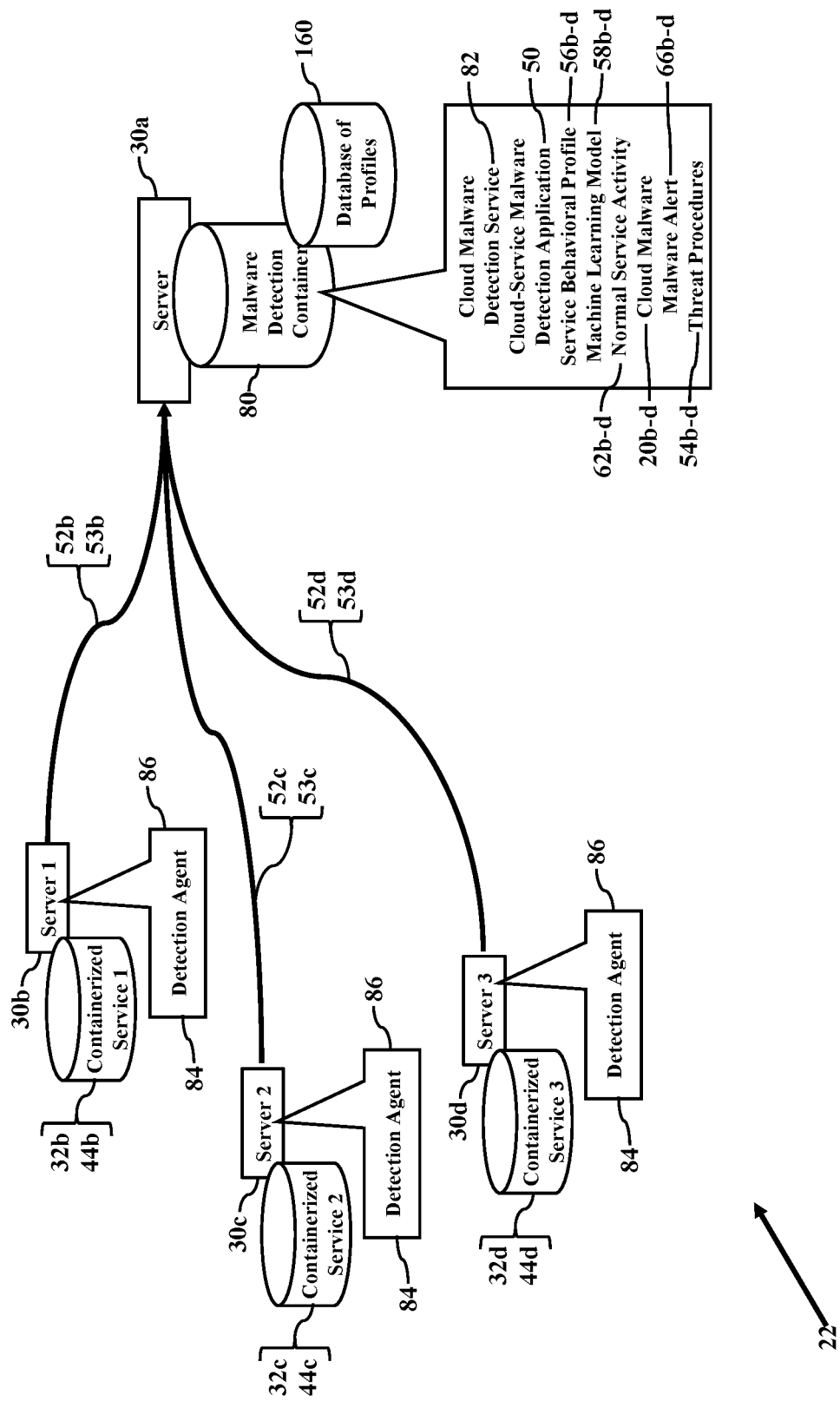
FIGS. 16-17 illustrate examples of service-specific profiling.
Figure 17:
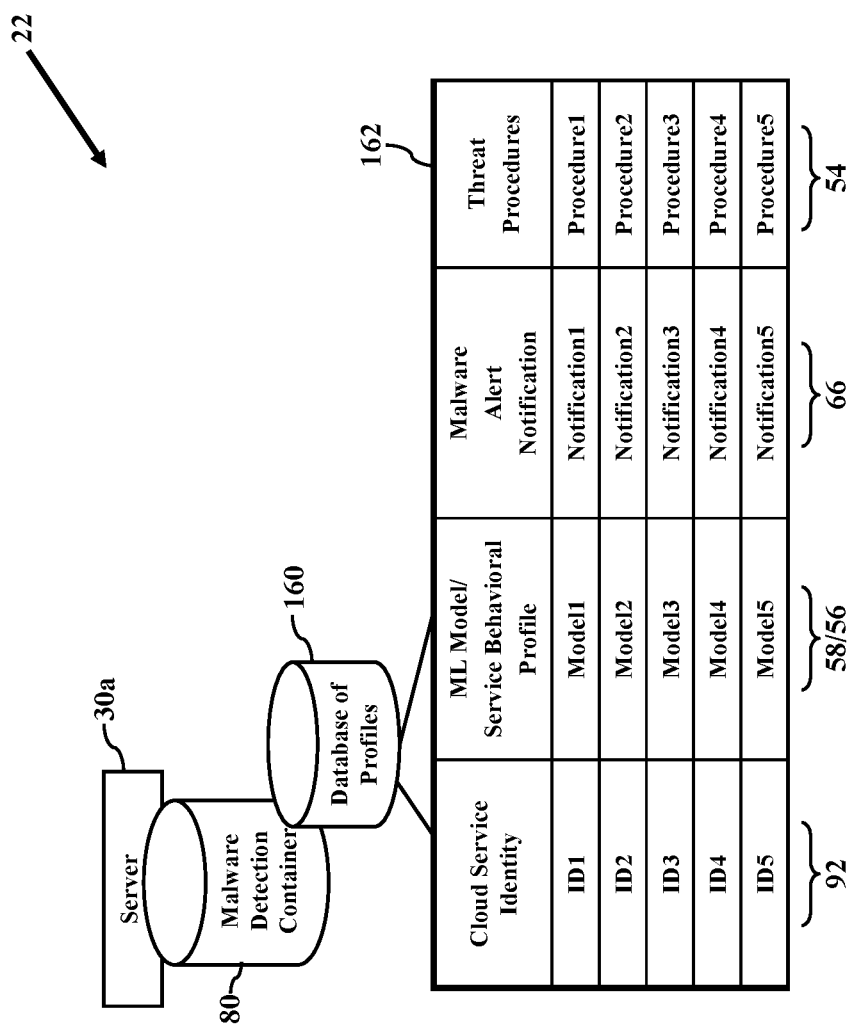

FIGS. 16-17 illustrate examples of container-specific profiling. As this disclosure above explains, the cloud malware detection service 82 may be a client resource available to all containerized services 32 and 44 affiliated with the cloud computing environment 22. The cloud malware detection service 82 may thus provide network-wide containerized cloud service malware detection. Moreover, the cloud malware detection service 82 may dynamically adapt to each different containerized service 32 and 44. That is, the cloud malware detection service 82 may generate a unique service behavioral profile 56 for each different containerized service 32 and 44. So, as the cloud malware detection service 82 receives the contemporaneous inter-service/inter-container activities 52/53 reported by a particular one of the cloud services 32, the cloud malware detection service 82 may query for and identify the corresponding service behavioral profile 56. Indeed, the cloud malware detection service 82 may even maintain electronic records indicating which machine learning model 58 is specified for the particular cloud malware detection service 82.

FIG. 16, for example, illustrates a database 160 of profiles. The database 160 of profiles has entries that define which service behavioral profile 56 is specified for each different containerized service 32 and 44. Again, the cloud-computing environment 22 may have hundreds or even thousands of different and distributed, containerized cloud services 32 and 44. For simplicity, then, FIG. 16 only illustrates the cloud malware detection service 82 communicating with three (3) network members 30b-d providing their corresponding containerized cloud services 32b-d and 44b-d. The network member 30a, in particular, hosts the malware detection container 80 providing the cloud malware detection service 82. As each containerized cloud service 32b-d and 44b-d sends its corresponding intra-service activities 52b-d, the cloud malware detection service 82 must apply the correct, corresponding service behavioral profile 56b-d.

FIG. 17 further illustrates the database 160 of profiles. The database 160 of profiles is illustrated as being integrated within the malware detection container 80 packaging the cloud-service malware detection application 50. The database 160 of profiles may thus be stored by the network member 30a that hosts the malware detection container 80 providing the cloud malware detection service 82. The database 160 of profiles, however, may optionally be remotely stored and accessed/queried for its database entries. Even though the database 160 of profiles may have any logical structure, a relational database is perhaps easiest to understand. FIG. 17 thus illustrates the database 160 of profiles as table 162 having row and columnar entries that map, relate, or associate each cloud service identifier 92 to its corresponding machine learning model 58, service behavioral profile 56, malware alert notification 66, and threat procedures 54. Again, for simplicity, the table 162 is illustrated as only having several rows and columns. In actual practice, though, the database 160 of profiles may have thousands of entries, as the cloud computing environment 22 may have thousands of different containerized services 32 and 44. Regardless, when the cloud malware detection service 82 determines the cloud service identifier 92 associated with the contemporaneous inter-service/inter-container activities 52/53, the cloud-service malware detection application 50 need only perform a database lookup for the corresponding entries. The cloud-service malware detection application 50 may thus quickly identify which machine learning model 58 is specified for the requesting cloud service 32. If the contemporaneous inter-service/inter-container activities 52/53 fail to statistically lie within the service behavioral profile 56, the database 160 of profiles further specifies the malware alert notification 66 to be generated and the threat procedures 54 to be executed. The database 160 of profiles thus allows the cloud malware detection service 82 to quickly switch between different service behavioral profiles 56 as different cloud service clients stream their inter-service/inter-container activities 52/53 for malware detection. This example of a database-oriented approach allows for efficient implementation of the cloud malware detection service 82.

The cloud malware detection service 82 is client and service agnostic. The cloud-service malware detection application 50 automatically and autonomously builds the service-specific behavioral profile 56 for each containerized cloud service 32 and 44. The cloud malware detection service 82 profiles/characterizes each different container 44 providing its corresponding cloud service 32. The cloud-service malware detection application 50 identifies and trains the service-specific machine learning model 58 with specific, inter-service activities 52 representing the normal or expected service activity 62 of the corresponding cloud service 32. Once trained, then, the cloud malware detection service 82 specifically detects the cloud malware 20 targeted to the corresponding cloud service 32. So, even though the cloud malware detection service 82 may be deployed as a network cloud malware detection resource, the cloud-service malware detection application 50 trains itself for individualized cloud malware detection service 82. The cloud-service malware detection application 50 need only be fed or trained with the specific samples or features 124 of the inter-service activities 52 conducted by the corresponding customer/client cloud service 32. The cloud-service malware detection application 50 may thus be deployed throughout the cloud-computing environment 22 with little or no custom coding or implementation. The cloud-service malware detection application 50 autonomously and automatically profiles each containerized cloud service 32 and 44. The cloud-service malware detection application 50 is thus agnostic to the cloud service 32 and to the container 44, thus quickly adapting and implementing cloud service-specific, container-specific, and application-specific malware detection.

The cloud-service malware detection application 50 provides still more improvements to computer functioning. Because the service behavioral profile 56 is automatically and autonomously created, the service behavioral profile 56 is much more accurate than manually-created profiles. Conventional, manually-created profiles must be written to include long branches of code implementing decisional rules. These manually-created profiles are simply too cumbersome and time-consuming to code for pattern recognition. The cloud-service malware detection application 50, in contradistinction, trains the machine learning model 58 using the features 124 extracted from the historical inter-service activities. The machine learning model 58 thus inspects the contemporaneous inter-service activities and identifies statistical patterns, thus greatly improving malware detection.

Scalability is another improvement to computer functioning. Conventional, manually-created profiles are simply too difficult to code, implement, and manage. Consider, for example, the cloud-service provider 40 that runs a cluster of computer machines, with the cluster having one hundred (100) computing nodes. Suppose, further, that each computing node runs one hundred (100) different containers 44, with each container providing its corresponding, unique cloud service 32. In other words, the cluster runs 10,000 containers 44. A team of human network administrator must then code 10,000 different profiles, and each profile must be managed, checked for accuracy, and implemented for production. This conventional, manual effort is simply not feasible for accurate and reliable malware detection. The cloud-service malware detection application 50, in contradistinction, is a single service that is merely invoked via its APIs 86. The cloud-service malware detection application 50 need only be trained using the service-specific features 124 (explained with reference to FIGS. 10-14). The cloud-service malware detection application 50 detects the service-specific cloud malware 20 by automatically profiling its customer cloud service 32. The cloud-service malware detection application 50 provides a scale of operation that is quick and simple to implement.

Profile management is another improvement to computer functioning. The cloud-native service application 36 can provide a better, faster, and/or cheaper cloud service 32. Conventional schemes must profile each version, check for accuracy, and approve for production. The cloud-service malware detection application 50, however, automatically profiles each version, thus greatly reducing manual efforts, hardware processing, and electricity consumption.

Figure 18:
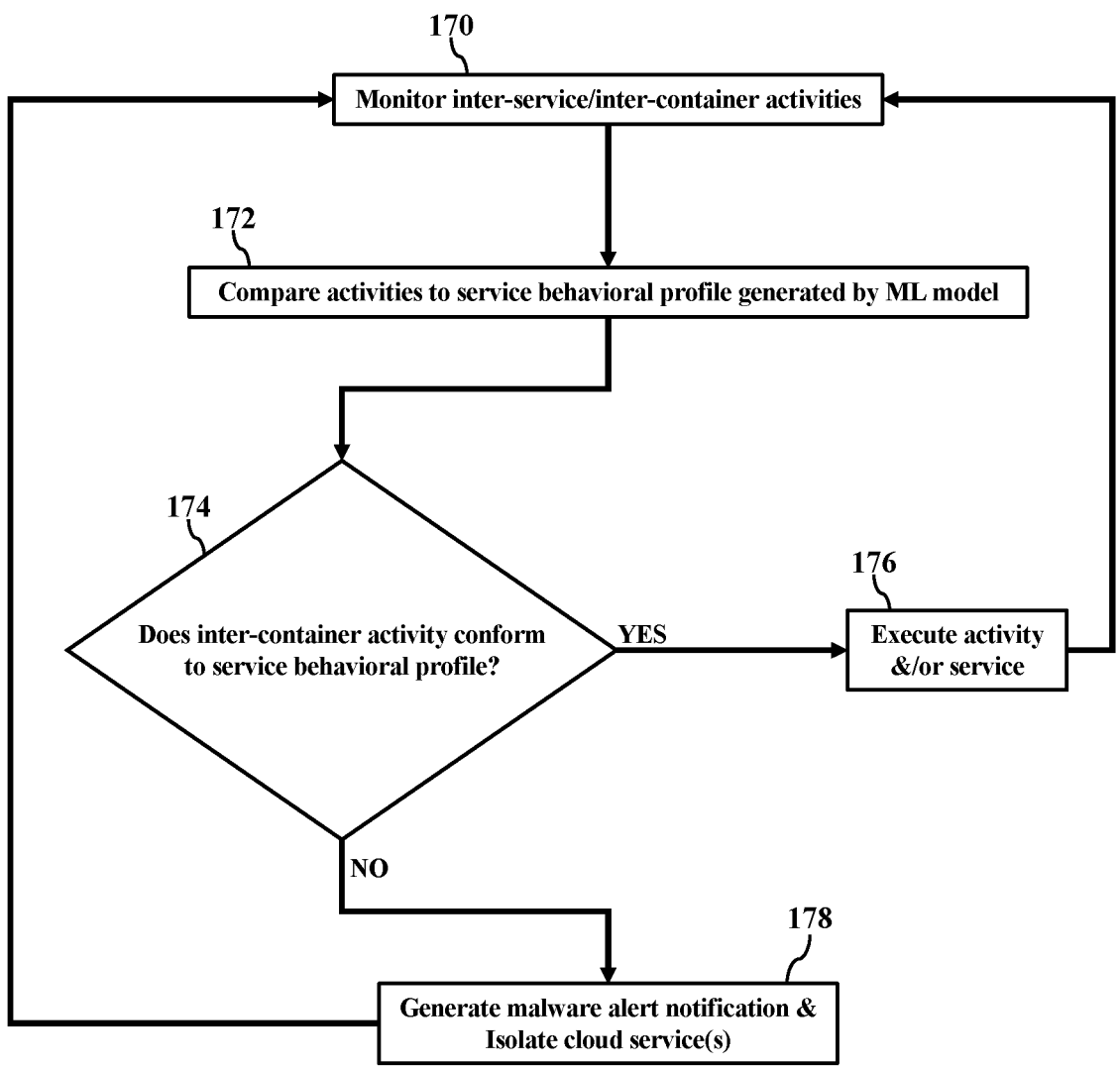
FIG. 18 illustrates another example of a method or operations for detecting the cloud malware in cloud services.

FIG. 18 illustrates another example of a method or operations for detecting the cloud malware 20 in the containerized service 32 and 44. The inter-service/inter-container activities 52/53 are monitored (Block 170). Any inter-service/inter-container activity 52/53 may be compared to the service behavioral profile 56 generated by the machine learning model 58 (Block 172). If the activity 52/53 conforms to the service behavioral profile 56 (Block 174), then either or both of the inter-service/inter-container activity 52/53 and/or the containerized service 32 and 44 may be executed (Block 176). However, if the inter-service/inter-container activity 52/53 fails to conform to the service behavioral profile 56 (Block 174), then, in response, the malware alert notification 66 may be generated to indicate that evidence of the cloud malware 20 is detected in the cloud service 32 (Block 178).

Figure 19:
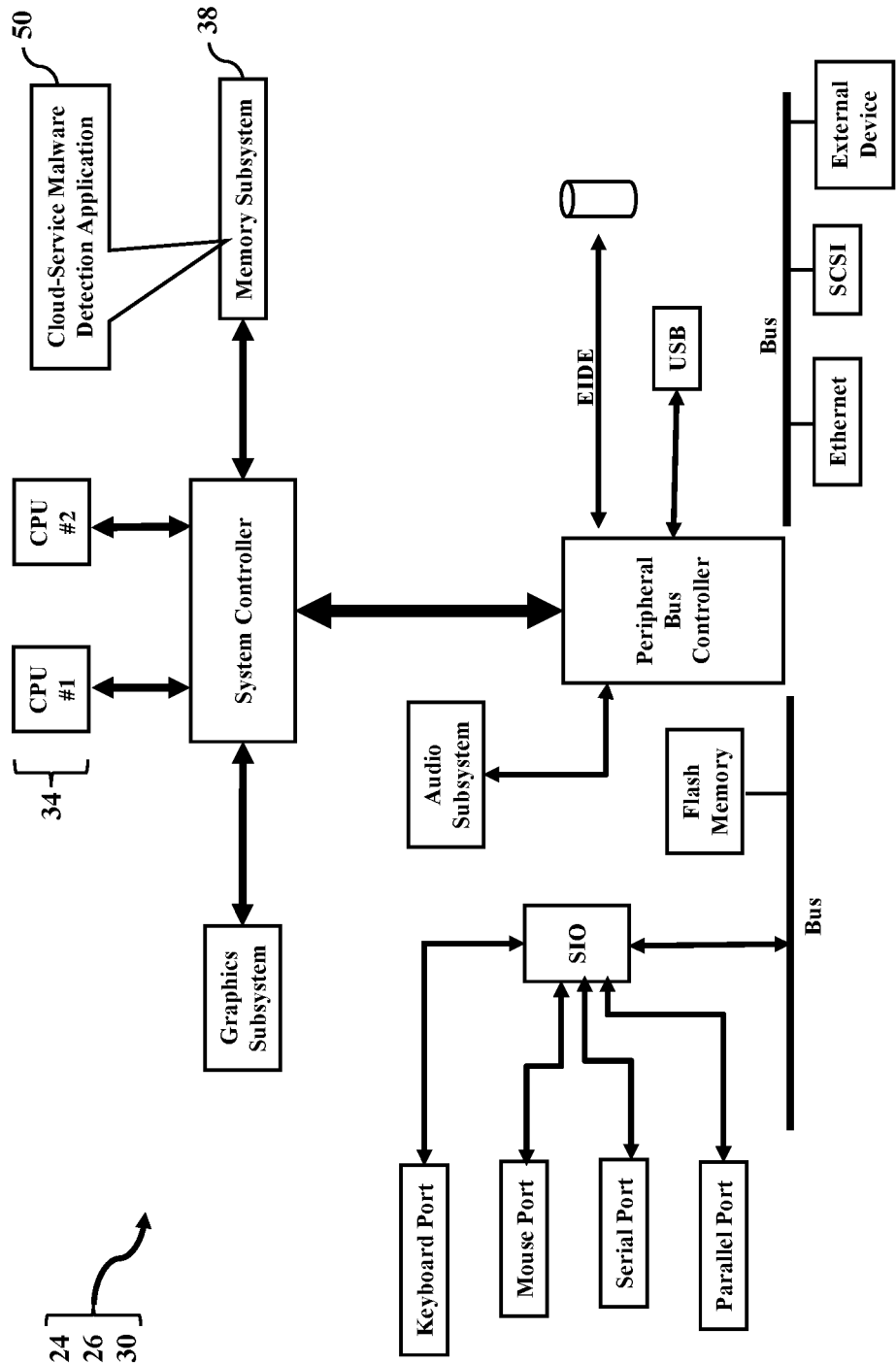
FIG. 19 illustrates a more detailed example of the operating environment.

FIG. 19 illustrates a more detailed example of the operating environment. FIG. 19 is a more detailed block diagram illustrating the computer 24 (and thus the server 26 and the network member 30). The cloud-service malware detection application 50 is stored in the memory subsystem or device 38. One or more of the processors 34 communicate with the memory subsystem or device 38 and execute the cloud-service malware detection application 50. Examples of the memory subsystem or device 38 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and any other read/write memory technology. Because the computer 24 is known to those of ordinary skill in the art, no detailed explanation is needed.

The computer 24 may have any embodiment. This disclosure mostly discusses the computer 24 as the server 26. The cloud malware detection service 82, however, may be easily adapted to mobile computing, wherein the computer 24 may be a smartphone, a laptop computer, a tablet computer, or a smartwatch. The cloud malware detection service 82 may also be easily adapted to other embodiments of smart devices, such as a television, an audio device, a remote control, and a recorder. The cloud malware detection service 82 may also be easily adapted to still more smart appliances, such as washers, dryers, and refrigerators. Indeed, as cars, trucks, and other vehicles grow in electronic usage and in processing power, the cloud malware detection service 82 may be easily incorporated into any vehicular controller.

The above examples of the cloud malware detection service 82 may be applied regardless of the networking environment. The cloud malware detection service 82 may be easily adapted to stationary or mobile devices having wide-area networking (e.g., 4G/LTE/5G cellular), wireless local area networking (WI-FI®), near field, and/or BLUETOOTH® capability. The cloud malware detection service 82 may be applied to stationary or mobile devices utilizing any portion of the electromagnetic spectrum and any signaling standard (such as the IEEE 802 family of standards, GSM/CDMA/TDMA or any cellular standard, and/or the ISM band). The cloud malware detection service 82, however, may be applied to any processor-controlled device operating in the radio-frequency domain and/or the Internet Protocol (IP) domain. The cloud malware detection service 82 may be applied to any processor-controlled device utilizing a distributed computing network, such as the Internet (sometimes alternatively known as the "World Wide Web"), an intranet, a local-area network (LAN), and/or a wide-area network (WAN). The cloud malware detection service 82 may be applied to any processor-controlled device utilizing power line technologies, in which signals are communicated via electrical wiring. Indeed, the many examples may be applied regardless of physical componentry, physical configuration, or communications standard(s).

The computer 24 and the network members 30 may utilize any processing component, configuration, or system. For example, the cloud malware detection service 82 may be easily adapted to any desktop, mobile, or server central processing unit or chipset offered by INTEL®, ADVANCED MICRO DEVICES®, ARM®, APPLE®, TAIWAN SEMICONDUCTOR MANUFACTURING®, QUALCOMM °, or any other manufacturer. The computer 24 may even use multiple central processing units or chipsets, which could include distributed processors or parallel processors in a single machine or multiple machines. The central processing unit or chipset can be used in supporting a virtual processing environment. The central processing unit or chipset could include a state machine or logic controller. When any of the central processing units or chipsets execute instructions to perform "operations," this could include the central processing unit or chipset performing the operations directly and/or facilitating, directing, or cooperating with another device or component to perform the operations.

The cloud malware detection service 82 may use packetized communications. When the computer 24, the server 36, or any network member 30 communicates via the communications network 28, information may be collected, sent, and retrieved. The information may be formatted or generated as packets of data according to a packet protocol (such as the Internet Protocol). The packets of data contain bits or bytes of data describing the contents, or payload, of a message. A header of each packet of data may be read or inspected and contain routing information identifying an origination address and/or a destination address.

The communications network 28 may utilize any signaling standard. The cloud computing environment 22 may mostly use wired networks to interconnect the network members 30. However, the cloud malware detection service 82 may utilize any communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or any variant of the GSM/CDMA/TDMA signaling standard. The cloud malware detection service 82 may also utilize other standards, such as the I.E.E.E. 802 family of standards, the Industrial, Scientific, and Medical band of the electromagnetic spectrum, BLUETOOTH®, low-power or near-field, and any other standard or value.

The cloud malware detection service 82 may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for providing the cloud malware detection service 82, as the above paragraphs explain.

The diagrams, schematics, illustrations, and the like represent conceptual views or processes illustrating examples of cloud services malware detection. The functions of the various elements shown in the figures may be provided through the use of dedicated hardware as well as hardware capable of executing instructions. The hardware, processes, methods, and/or operating systems described herein are for illustrative purposes and, thus, are not intended to be limited to any particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A computer that detects a cloud malware infecting containerized services, comprising:
   at least one central processing unit; and
   at least one memory device storing instructions that, when executed by the at least one central processing unit, perform operations, the operations comprising:
   monitoring inter-container activities conducted between the containerized services hosted by different network nodes in a cloud-computing environment;
   identifying a service identifier associated with an inter-container activity of the inter-container activities conducted between the containerized services hosted by the different network nodes;
   identifying a container-specific service behavioral profile that is associated with the service identifier;
   comparing the inter-container activity to the container-specific service behavioral profile generated by a machine learning model trained using historical inter-container activities historically conducted between the containerized services hosted by the different network nodes;
   determining that the inter-container activity fails to conform to the container-specific service behavioral profile generated by the machine learning model; and
   in response to the determining that the inter-container activity fails to conform to the container-specific service behavioral profile, generating a malware alert notification indicating the cloud malware is detected in the containerized services.

2. The computer of claim 1, wherein the operations further comprise training the machine learning model using a cloud configuration data, a service topology, a runtime network instrumentation, Domain Name Service (DNS) records, and an Internet Protocol reputation.

3. The computer of claim 2, wherein the operations further comprise generating a statistical model using the cloud configuration data, the service topology, the runtime network instrumentation, the DNS records, and the Internet Protocol reputation.

4. The computer of claim 1, wherein in response to the determining that the inter-container activity fails to conform to the container-specific service behavioral profile, further comprising isolating at least one of the containerized services.

5. The computer of claim 1, wherein the operations further comprise comparing inter-container communications conducted between the containerized services to the container-specific service behavioral profile.

6. The computer of claim 1, wherein the operations further comprise installing a detection agent that reports the inter-container activities conducted between the containerized services.

7. The computer of claim 1, wherein the operations further comprise comparing application programming interfaces called by any of the containerized services to the container-specific service behavioral profile.

8. A memory device storing instructions that, when executed by at least one central processing unit, perform operations that detect a cloud malware infecting containerized services, the operations comprising:
   monitoring inter-container activities conducted between the containerized services hosted by different network nodes in a cloud-computing environment;
   identifying a service identifier associated with an inter-container activity of the inter-container activities conducted between the containerized services hosted by the different network nodes;
   identifying a container-specific service behavioral profile by querying a database having entries that specify different container-specific service behavioral profiles to their corresponding service identifiers including an entry that specifies the container-specific service behavioral profile for the inter-container activity associated with the service identifier;
   comparing the inter-container activity to the container-specific service behavioral profile generated by a machine learning model trained using historical observations of the inter-container activities also associated with the service identifier;
   determining that the inter-container activity fails to conform to the container-specific service behavioral profile generated by the machine learning model; and
   in response to the determining that the inter-container activity fails to conform to the container-specific service behavioral profile, generating a malware alert notification indicating the cloud malware is detected in the containerized services.

9. The memory device of claim 8, wherein the operations further comprise comparing inter-container communications conducted between the containerized services to the service behavioral profile.

10. The memory device of claim 8, wherein the operations further comprise training the machine learning model using a cloud configuration data, a service topology, a runtime network instrumentation, Domain Name Service (DNS) records, and an Internet Protocol reputation.

11. The memory device of claim 10, wherein the operations further comprise generating a statistical model using the cloud configuration data, the service topology, the runtime network instrumentation, the Domain Name Service (DNS) records, and the Internet Protocol reputation.

12. The memory device of claim 8, wherein the operations further comprise comparing application programming interfaces called by any of the containerized services to the container-specific service behavioral profile.

13. The memory device of claim 8, wherein in response to the determining that the inter-container activity fails to conform to the container-specific service behavioral profile, further comprising isolating at least one of the containerized services.

14. The memory device of claim 8, wherein the operations further comprise:
   determining that the inter-container activity conforms to the container-specific service behavioral profile generated by the machine learning model; and
   executing a containerized service of the containerized services.

15. A method that detects a cloud malware infecting containerized services, comprising:
   monitoring inter-container activities conducted between the containerized services hosted by different network nodes in a cloud-computing environment;
   identifying a service identifier associated with an inter-container activity of the inter-container activities conducted between the containerized services hosted by the different network nodes;
   identifying a container-specific service behavioral profile that is associated with the service identifier;
   comparing the inter-container activity to the container-specific service behavioral profile generated by a machine learning model trained using historical inter-container activities historically conducted between the containerized services hosted by the different network nodes;
   determining that the inter-container activity fails to conform to the container-specific service behavioral profile generated by the machine learning model; and
   in response to the determining that the inter-container activity fails to conform to the container-specific service behavioral profile, generating a malware alert notification indicating the cloud malware is detected in the containerized services.

16. The method of claim 15, further comprising training the machine learning model using a cloud configuration data, a service topology, a runtime network instrumentation, Domain Name Service (DNS) records, and an Internet Protocol reputation.

17. The method of claim 16, further comprising generating a statistical model using the cloud configuration data, the service topology, the runtime network instrumentation, the DNS records, and the Internet Protocol reputation.

18. The method of claim 15, further comprising comparing inter-container communications conducted between the containerized services to the container-specific service behavioral profile.

19. The method of claim 15, further comprising installing a detection agent that reports the inter-container activities conducted between the containerized services.

20. The method of claim 15, further comprising comparing application programming interfaces called by any of the containerized services to the container-specific service behavioral profile.

* * * * *